United States Patent
Kurosawa

[11] Patent Number: 5,881,264
[45] Date of Patent: Mar. 9, 1999

[54] MEMORY CONTROLLER AND MEMORY CONTROL SYSTEM

[75] Inventor: Yasuhiko Kurosawa, Tokyo, Japan

[73] Assignee: Kabushiki Kaisha Toshiba, Kawasaki, Japan

[21] Appl. No.: 790,919

[22] Filed: Jan. 29, 1997

[30] Foreign Application Priority Data

Jan. 31, 1996 [JP] Japan .................................. 8-015726

[51] Int. Cl.⁶ ..................................................... G06F 9/22
[52] U.S. Cl. ............................................................ 395/393
[58] Field of Search ................................ 395/376, 390, 395/392, 393

[56] References Cited

U.S. PATENT DOCUMENTS

| 5,627,984 | 5/1997 | Gupta et al. | 395/392 |
| 5,634,026 | 5/1997 | Heaslip et al. | 395/393 |
| 5,640,588 | 6/1997 | Vegesna et al. | 395/800 |
| 5,699,537 | 12/1997 | Sharangpani et al. | 395/393 |
| 5,764,942 | 6/1998 | Kahle et al. | 395/390 |

OTHER PUBLICATIONS

James Smith, "Dynamic Instruction Scheduling and the Astronautics ZS–1", 1989 IEEE.

*Primary Examiner*—David Y. Eng
*Attorney, Agent, or Firm*—Finnegan, Henderson, Farabow, Garrett & Dunner, L.L.P.

[57] ABSTRACT

A memory controller provided on a multiprocessor system has a scoreboard used to manage the progress of memory access operations (the operating state of access instructions) and reduces the overhead in executing synchronization at a high level of execution priority. The scoreboard holds synchronization flags set in response to the acceptance of synchronization as well as the operation codes and addresses of the accepted access instructions. The memory controller sets a synchronization flag at the time when it has accepted a synchronizing instruction from the processor, and then resets the synchronization flag after the execution of the synchronizing operation has been completed.

14 Claims, 41 Drawing Sheets

FIG.7A

SCOREBOARD 110

| No. | ADDRESS | INSTRUCTION | Val | En | SYNC | ENABLE/DISABLE |
|---|---|---|---|---|---|---|
| 3 | | | I | NO | 0 | (a) |
| 2 | | | I | NO | 0 | (a) |
| 1 | | | I | NO | 0 | (a) |
| 0 | | | I | NO | 0 | (a) |

FIG.7B

SCOREBOARD 100

| No. | ADDRESS | INSTRUCTION | Val | En | SYNC | ENABLE/DISABLE |
|---|---|---|---|---|---|---|
| 3 | | | I | NO | 0 | (a) |
| 2 | | | I | NO | 0 | (a) |
| 1 | | | I | NO | 0 | (a) |
| 0 | | | I | NO | 0 | (a) |

FIG.7C

SYNCHRONIZING COMPLETION TABLE

| AREA | SYNC COMPLETION |
|---|---|
| 3 | 0 |
| 2 | 0 |
| 1 | 0 |
| 0 | 0 |

FIG.8A

SCOREBOARD 110

| No. | ADDRESS | INSTRUCTION | Val | En | SYNC | ENABLE/DISABLE |
|---|---|---|---|---|---|---|
| 3 | | | I | NO | 0 | (a) |
| 2 | | | I | NO | 0 | (a) |
| 1 | | | I | NO | 0 | (a) |
| 0 | | | I | NO | 0 | (a) |

FIG.8B

SCOREBOARD 100

| No. | ADDRESS | INSTRUCTION | Val | En | SYNC | ENABLE/DISABLE |
|---|---|---|---|---|---|---|
| 3 | | | I | NO | 0 | (a) |
| 2 | | | I | NO | 0 | (a) |
| 1 | | | I | NO | 0 | (a) |
| 0 | 12380 | WRITE | ->V | ->YES | ->0 | (x) |

FIG.8C

SYNCHRONIZING COMPLETION TABLE

| AREA | SYNC COMPLETION |
|---|---|
| 3 | 0 |
| 2 | 0 |
| 1 | 0 |
| 0 | 0 |

FIG.9A

SCOREBOARD 110

| No. | ADDRESS | INSTRUCTION | Val | En | SYNC | ENABLE/DISABLE |
|---|---|---|---|---|---|---|
| 3 | | | I | NO | 0 | (a) |
| 2 | | | I | NO | 0 | (a) |
| 1 | | | I | NO | 0 | (a) |
| 0 | 246824 | READ | ->V | ->YES | ->0 | (x) |

FIG.9B

SCOREBOARD 100

| No. | ADDRESS | INSTRUCTION | Val | En | SYNC | ENABLE/DISABLE |
|---|---|---|---|---|---|---|
| 3 | | | I | NO | 0 | (a) |
| 2 | | | I | NO | 0 | (a) |
| 1 | | | I | NO | 0 | (a) |
| 0 | 12380 | WRITE | V | YES | 0 | (x) |

FIG.9C

SYNCHRONIZING COMPLETION TABLE

| AREA | SYNC COMPLETION |
|---|---|
| 3 | 0 |
| 2 | 0 |
| 1 | 0 |
| 0 | 0 |

FIG.10A

SCOREBOARD 110

| No. | ADDRESS | INSTRUCTION | Val | En | SYNC | ENABLE/DISABLE |
|---|---|---|---|---|---|---|
| 3 | | | I | NO | 0 | (a) |
| 2 | | | I | NO | 0 | (a) |
| 1 | | | I | NO | 0 | (a) |
| 0 | 246824 | READ | V | YES | 0 | (x) |

FIG.10B

SCOREBOARD 100

| No. | ADDRESS | INSTRUCTION | Val | En | SYNC | ENABLE/DISABLE |
|---|---|---|---|---|---|---|
| 3 | | | I | NO | 0 | (a) |
| 2 | | | I | NO | 0 | (a) |
| 1 | 67830 | READ | ->V | ->YES | ->0 | (x) |
| 0 | 12380 | WRITE | V | YES | 0 | (x) |

FIG.10C

SYNCHRONIZING COMPLETION TABLE

| AREA | SYNC COMPLETION |
|---|---|
| 3 | 0 |
| 2 | 0 |
| 1 | 0 |
| 0 | 0 |

FIG.11A

SCOREBOARD 110

| No. | ADDRESS | INSTRUCTION | Val | En | SYNC | ENABLE/DISABLE |
|---|---|---|---|---|---|---|
| 3 | | | I | NO | 0 | (a) |
| 2 | | | I | NO | 0 | (a) |
| 1 | | | I | NO | 0 | (a) |
| 0 | 246824 | READ | V | YES | 0 | (x) |

FIG.11B

SCOREBOARD 100

| No. | ADDRESS | INSTRUCTION | Val | En | SYNC | ENABLE/DISABLE |
|---|---|---|---|---|---|---|
| 3 | | | I | NO | 0 | (a) |
| 2 | | | I | NO | 0 | (a) |
| 1 | 67830 | READ | V | YES | 0 | (x) |
| 0 | 12380 | WRITE | V | ->NO | 0 | (b) |

FIG.11C

SYNCHRONIZING COMPLETION TABLE

| AREA | SYNC COMPLETION |
|---|---|
| 3 | 0 |
| 2 | 0 |
| 1 | 0 |
| 0 | 0 |

FIG.12A

SCOREBOARD 110

| No. | ADDRESS | INSTRUCTION | Val | En | SYNC | ENABLE/DISABLE |
|---|---|---|---|---|---|---|
| 3 | | | I | NO | 0 | (a) |
| 2 | | | I | NO | 0 | (a) |
| 1 | | | I | NO | 0 | (a) |
| 0 | 246824 | READ | V | YES | ->1 | (y) |

FIG.12B

SCOREBOARD 100

| No. | ADDRESS | INSTRUCTION | Val | En | SYNC | ENABLE/DISABLE |
|---|---|---|---|---|---|---|
| 3 | | | I | NO | 0 | (a) |
| 2 | | | I | NO | 0 | (a) |
| 1 | 67830 | READ | V | YES | ->1 | (y) |
| 0 | 12380 | WRITE | V | NO | ->1 | (b) |

FIG.12C

SYNCHRONIZING COMPLETION TABLE

| AREA | SYNC COMPLETION |
|---|---|
| 3 | 0 |
| 2 | 0 |
| 1 | ->1 |
| 0 | ->1 |

FIG.13A SCOREBOARD 110

| No. | ADDRESS | INSTRUCTION | Val | En | SYNC | ENABLE/DISABLE |
|---|---|---|---|---|---|---|
| 3 | | | I | NO | 0 | (a) |
| 2 | | | I | NO | 0 | (a) |
| 1 | | | I | NO | 0 | (a) |
| 0 | 246824 | READ | V | YES | 1 | (y) |

FIG.13B SCOREBOARD 100

| No. | ADDRESS | INSTRUCTION | Val | En | SYNC | ENABLE/DISABLE |
|---|---|---|---|---|---|---|
| 3 | | | I | NO | 0 | (a) |
| 2 | abcd70 | READ | ->V | ->YES | ->0 | (c) |
| 1 | 67830 | READ | V | YES | 1 | (y) |
| 0 | 12380 | WRITE | V | NO | 1 | (b) |

FIG.13C SYNCHRONIZING COMPLETION TABLE

| AREA | SYNC COMPLETION |
|---|---|
| 3 | 0 |
| 2 | 0 |
| 1 | 1 |
| 0 | 1 |

FIG.14A SCOREBOARD 110

| No. | ADDRESS | INSTRUCTION | Val | En | SYNC | ENABLE/DISABLE |
|---|---|---|---|---|---|---|
| 3 | | | I | NO | 0 | (a) |
| 2 | | | I | NO | 0 | (a) |
| 1 | | | I | NO | 0 | (a) |
| 0 | 246824 | READ | V | ->NO | 1 | (b) |

FIG.14B SCOREBOARD 100

| No. | ADDRESS | INSTRUCTION | Val | En | SYNC | ENABLE/DISABLE |
|---|---|---|---|---|---|---|
| 3 | | | I | NO | 0 | (a) |
| 2 | abcd70 | READ | V | YES | 0 | (c) |
| 1 | 67830 | READ | V | ->NO | 1 | (b) |
| 0 | 12380 | WRITE | V | NO | 1 | (b) |

FIG.14C SYNCHRONIZING COMPLETION TABLE

| AREA | SYNC COMPLETION |
|---|---|
| 3 | 0 |
| 2 | 0 |
| 1 | 1 |
| 0 | 1 |

FIG.15A

SCOREBOARD 110

| No. | ADDRESS | INSTRUCTION | Val | En | SYNC | ENABLE/DISABLE |
|---|---|---|---|---|---|---|
| 3 | | | I | NO | 0 | (a) |
| 2 | | | I | NO | 0 | (a) |
| 1 | | | I | NO | 0 | (a) |
| 0 | 246824 | READ | V | NO | 1 | (b) |

FIG.15B

SCOREBOARD 100

| No. | ADDRESS | INSTRUCTION | Val | En | SYNC | ENABLE/DISABLE |
|---|---|---|---|---|---|---|
| 3 | | | I | NO | 0 | (a) |
| 2 | abcd70 | READ | V | YES | 0 | (c) |
| 1 | 67830 | READ | ->I | NO | ->0 | (a) |
| 0 | 12380 | WRITE | ->I | NO | ->0 | (a) |

FIG.15C

SYNCHRONIZING COMPLETION TABLE

| AREA | SYNC COMPLETION |
|---|---|
| 3 | 0 |
| 2 | 0 |
| 1 | 1 |
| 0 | ->0 |

FIG.16A

SCOREBOARD 110

| No. | ADDRESS | INSTRUCTION | Val | En | SYNC | ENABLE/DISABLE |
|---|---|---|---|---|---|---|
| 3 | | | I | NO | 0 | (a) |
| 2 | | | I | NO | 0 | (a) |
| 1 | | | I | NO | 0 | (a) |
| 0 | 246824 | READ | ->I | NO | ->0 | (a) |

FIG.16B

SCOREBOARD 100

| No. | ADDRESS | INSTRUCTION | Val | En | SYNC | ENABLE/DISABLE |
|---|---|---|---|---|---|---|
| 3 | | | I | NO | 0 | (a) |
| 2 | abcd70 | READ | V | YES | 0 | (x) |
| 1 | 67830 | READ | I | NO | 0 | (a) |
| 0 | 12380 | WRITE | I | NO | 0 | (a) |

FIG.16C

SYNCHRONIZING COMPLETION TABLE

| AREA | SYNC COMPLETION |
|---|---|
| 3 | 0 |
| 2 | 0 |
| 1 | ->0 |
| 0 | 0 |

FIG.19A

SCOREBOARD

| No. | ADDRESS | INSTRUCTION | Val | En | SYNC | ENABLE/DISABLE |
|---|---|---|---|---|---|---|
| 3 | | | I | NO | 0 | (a) |
| 2 | | | I | NO | 0 | (a) |
| 1 | | | I | NO | 0 | (a) |
| 0 | | | I | NO | 0 | (a) |

FIG.19B

SYNCHRONIZING COMPLETION TABLE

| AREA | SYNC COMPLETION |
|---|---|
| 3 | 0 |
| 2 | 0 |
| 1 | 0 |
| 0 | 0 |

FIG.20A

SCOREBOARD

| No. | ADDRESS | INSTRUCTION | Val | En | SYNC | ENABLE/DISABLE |
|---|---|---|---|---|---|---|
| 3 | | | I | NO | 0 | (a) |
| 2 | | | I | NO | 0 | (a) |
| 1 | | | I | NO | 0 | (a) |
| 0 | 12380 | READ | ->V | ->YES | ->0 | (x) |

FIG.20B

SYNCHRONIZING COMPLETION TABLE

| AREA | SYNC COMPLETION |
|---|---|
| 3 | 0 |
| 2 | 0 |
| 1 | 0 |
| 0 | 0 |

FIG.21A

SCOREBOARD

| No. | ADDRESS | INSTRUCTION | Val | En | SYNC | ENABLE/DISABLE |
|---|---|---|---|---|---|---|
| 3 | | | I | NO | 0 | (a) |
| 2 | | | I | NO | 0 | (a) |
| 1 | | | I | NO | 0 | (a) |
| 0 | 12380 | READ | V | YES | ->1 | (y) |

FIG.21B

SYNCHRONIZING COMPLETION TABLE

| AREA | SYNC COMPLETION |
|---|---|
| 3 | 0 |
| 2 | 0 |
| 1 | 0 |
| 0 | ->1 |

FIG.22A

SCOREBOARD

| No. | ADDRESS | INSTRUCTION | Val | En | SYNC | ENABLE/DISABLE |
|---|---|---|---|---|---|---|
| 3 | | | I | NO | 0 | (a) |
| 2 | | | I | NO | 0 | (a) |
| 1 | 67830 | WRITE | ->V | ->YES | 0 | (z) |
| 0 | 12380 | READ | V | YES | 1 | (y) |

FIG.22B

SYNCHRONIZING COMPLETION TABLE

| AREA | SYNC COMPLETION |
|---|---|
| 3 | 0 |
| 2 | 0 |
| 1 | 0 |
| 0 | 1 |

FIG.23A

SCOREBOARD

| No. | ADDRESS | INSTRUCTION | Val | En | SYNC | ENABLE/DISABLE |
|---|---|---|---|---|---|---|
| 3 | | | I | NO | 0 | (a) |
| 2 | 12380 | WRITE | ->V | ->YES | 0 | (c) |
| 1 | 67830 | WRITE | V | YES | 0 | (z) |
| 0 | 12380 | READ | V | YES | 1 | (y) |

FIG.23B

SYNCHRONIZING COMPLETION TABLE

| AREA | SYNC COMPLETION |
|---|---|
| 3 | 0 |
| 2 | 0 |
| 1 | 0 |
| 0 | 1 |

FIG.27A

SCOREBOARD

| No. | ADDRESS | INSTRUCTION | Val | En | SYNC 0 | 1 | 2 | 3 | ENABLE/DISABLE |
|---|---|---|---|---|---|---|---|---|---|
| 3 | | | I | NO | 0 | 0 | 0 | 0 | (a) |
| 2 | | | I | NO | 0 | 0 | 0 | 0 | (a) |
| 1 | | | I | NO | 0 | 0 | 0 | 0 | (a) |
| 0 | | | I | NO | 0 | 0 | 0 | 0 | (a) |

FIG.27B

SYNCHRONIZING COMPLETION TABLE

| SYNC READ POINTER | 0 |
|---|---|
| SYNC WRITE POINTER | 0 |

| AREA | SYNC COMPLETION 0 | 1 | 2 | 3 |
|---|---|---|---|---|
| 3 | 0 | 0 | 0 | 0 |
| 2 | 0 | 0 | 0 | 0 |
| 1 | 0 | 0 | 0 | 0 |
| 0 | 0 | 0 | 0 | 0 |

FIG.28A

SCOREBOARD

| No. | ADDRESS | INSTRUCTION | Val | En | SYNC 0 | 1 | 2 | 3 | ENABLE/DISABLE |
|---|---|---|---|---|---|---|---|---|---|
| 3 | | | I | NO | 0 | 0 | 0 | 0 | (a) |
| 2 | | | I | NO | 0 | 0 | 0 | 0 | (a) |
| 1 | | | I | NO | 0 | 0 | 0 | 0 | (a) |
| 0 | 12380 | READ | ->V | ->YES | ->0 | 0 | 0 | 0 | (x) |

FIG.28B

SYNCHRONIZING COMPLETION TABLE

| SYNC READ POINTER | 0 |
|---|---|
| SYNC WRITE POINTER | 0 |

| AREA | SYNC COMPLETION 0 | 1 | 2 | 3 |
|---|---|---|---|---|
| 3 | 0 | 0 | 0 | 0 |
| 2 | 0 | 0 | 0 | 0 |
| 1 | 0 | 0 | 0 | 0 |
| 0 | 0 | 0 | 0 | 0 |

FIG.29A

SCOREBOARD

| No. | ADDRESS | INSTRUCTION | Val | En | SYNC 0 | 1 | 2 | 3 | ENABLE/DISABLE |
|---|---|---|---|---|---|---|---|---|---|
| 3 | | | I | NO | 0 | 0 | 0 | 0 | (a) |
| 2 | | | I | NO | 0 | 0 | 0 | 0 | (a) |
| 1 | | | I | NO | 0 | 0 | 0 | 0 | (a) |
| 0 | 12380 | READ | V | YES | ->1 | 0 | 0 | 0 | (y) |

FIG.29B

SYNCHRONIZING COMPLETION TABLE

| SYNC READ POINTER | 0 |
|---|---|
| SYNC WRITE POINTER | ->1 |

| AREA | SYNC COMPLETION 0 | 1 | 2 | 3 |
|---|---|---|---|---|
| 3 | 0 | 0 | 0 | 0 |
| 2 | 0 | 0 | 0 | 0 |
| 1 | 0 | 0 | 0 | 0 |
| 0 | ->1 | 0 | 0 | 0 |

FIG.30A

SCOREBOARD

| No. | ADDRESS | INSTRUCTION | Val | En | SYNC 0 | 1 | 2 | 3 | ENABLE/DISABLE |
|---|---|---|---|---|---|---|---|---|---|
| 3 |  |  | I | NO | 0 | 0 | 0 | 0 | (a) |
| 2 |  |  | I | NO | 0 | 0 | 0 | 0 | (a) |
| 1 | 67380 | WRITE | ->V | ->YES | ->0 | 0 | 0 | 0 | (c) |
| 0 | 12380 | READ | V | YES | 1 | 0 | 0 | 0 | (y) |

FIG.30B

SYNCHRONIZING COMPLETION TABLE

| SYNC READ POINTER | 0 |
|---|---|
| SYNC WRITE POINTER | 1 |

| AREA | SYNC COMPLETION 0 | 1 | 2 | 3 |
|---|---|---|---|---|
| 3 | 0 | 0 | 0 | 0 |
| 2 | 0 | 0 | 0 | 0 |
| 1 | 0 | 0 | 0 | 0 |
| 0 | 1 | 0 | 0 | 0 |

FIG.31A

SCOREBOARD

| No. | ADDRESS | INSTRUCTION | Val | En | SYNC 0 | 1 | 2 | 3 | ENABLE/DISABLE |
|---|---|---|---|---|---|---|---|---|---|
| 3 |  |  | I | NO | 0 | 0 | 0 | 0 | (a) |
| 2 |  |  | I | NO | 0 | 0 | 0 | 0 | (a) |
| 1 | 67380 | WRITE | V | YES | 0 | ->1 | 0 | 0 | (c) |
| 0 | 12380 | READ | V | YES | 1 | ->1 | 0 | 0 | (y) |

FIG.31B

SYNCHRONIZING COMPLETION TABLE

| SYNC READ POINTER | 0 |
|---|---|
| SYNC WRITE POINTER | ->2 |

| AREA | SYNC COMPLETION 0 | 1 | 2 | 3 |
|---|---|---|---|---|
| 3 | 0 | 0 | 0 | 0 |
| 2 | 0 | 0 | 0 | 0 |
| 1 | 0 | 0 | 0 | 0 |
| 0 | 1 | ->1 | 0 | 0 |

FIG.32A

SCOREBOARD

| No. | ADDRESS | INSTRUCTION | Val | En | SYNC 0 | 1 | 2 | 3 | ENABLE/DISABLE |
|---|---|---|---|---|---|---|---|---|---|
| 3 |  |  | I | NO | 0 | 0 | 0 | 0 | (a) |
| 2 | abcd80 | WRITE | ->V | ->YES | 0 | 0 | 0 | 0 | (c) |
| 1 | 67380 | WRITE | V | YES | 0 | 1 | 0 | 0 | (c) |
| 0 | 12380 | READ | V | YES | 1 | 1 | 0 | 0 | (y) |

FIG.32B

SYNCHRONIZING COMPLETION TABLE

| SYNC READ POINTER | 0 |
|---|---|
| SYNC WRITE POINTER | ->2 |

| AREA | SYNC COMPLETION 0 | 1 | 2 | 3 |
|---|---|---|---|---|
| 3 | 0 | 0 | 0 | 0 |
| 2 | 0 | 0 | 0 | 0 |
| 1 | 0 | 0 | 0 | 0 |
| 0 | 1 | 1 | 0 | 0 |

FIG.33A

SCOREBOARD

| No. | ADDRESS | INSTRUCTION | Val | En | SYNC 0 | 1 | 2 | 3 | ENABLE/DISABLE |
|---|---|---|---|---|---|---|---|---|---|
| 3 | | | I | NO | 0 | 0 | 0 | 0 | (a) |
| 2 | abcd80 | WRITE | V | YES | 0 | 0 | 0 | 0 | (c) |
| 1 | 67380 | WRITE | V | YES | 0 | 1 | 0 | 0 | (y) |
| 0 | 12380 | READ | ->I | ->NO | ->0 | ->0 | 0 | 0 | (a) |

FIG.33B

SYNCHRONIZING COMPLETION TABLE

| SYNC READ POINTER | ->1 |
|---|---|
| SYNC WRITE POINTER | 2 |

| AREA | SYNC COMPLETION 0 | 1 | 2 | 3 |
|---|---|---|---|---|
| 3 | 0 | 0 | 0 | 0 |
| 2 | 0 | 0 | 0 | 0 |
| 1 | 0 | 0 | 0 | 0 |
| 0 | ->0 | 1 | 0 | 0 |

SCOREBOARD

| No. | ADDRESS | INSTRUCTION | Val | En | ORDER | ENABLE/DISABLE |
|---|---|---|---|---|---|---|
| 3 |  |  | I | NO | - | (a) |
| 2 |  |  | I | NO | - | (a) |
| 1 |  |  | I | NO | - | (a) |
| 0 |  |  | I | NO | - | (a) |

FIG.46

SCOREBOARD

| No. | ADDRESS | INSTRUCTION | Val | En | ORDER | ENABLE/DISABLE |
|---|---|---|---|---|---|---|
| 3 |  |  | I | NO | - | (a) |
| 2 |  |  | I | NO | - | (a) |
| 1 |  |  | I | NO | - | (a) |
| 0 | 12380 | READ | ->V | ->YES | ->- | (w) |

FIG.47

SCOREBOARD

| No. | ADDRESS | INSTRUCTION | Val | En | ORDER | ENABLE/DISABLE |
|---|---|---|---|---|---|---|
| 3 |  |  | I | NO | - | (a) |
| 2 |  |  | I | NO | - | (a) |
| 1 | 67380 | WRITE | ->V | ->YES | ->- | (w) |
| 0 | 12380 | READ | V | YES | - | (w) |

FIG.48

SCOREBOARD

| No. | ADDRESS | INSTRUCTION | Val | En | ORDER | ENABLE/DISABLE |
|---|---|---|---|---|---|---|
| 3 |  |  | I | NO | - | (a) |
| 2 | 12380 | WRITE | ->V | ->YES | ->0 | (d) |
| 1 | 67380 | WRITE | V | YES | - | (w) |
| 0 | 12380 | READ | V | YES | - | (w) |

FIG.49

SCOREBOARD

| No. | ADDRESS | INSTRUCTION | Val | En | ORDER | ENABLE/DISABLE |
|---|---|---|---|---|---|---|
| 3 | 12380 | READ | ->V | ->YES | ->2 | (d) |
| 2 | 12380 | WRITE | V | YES | 0 | (d) |
| 1 | 67380 | WRITE | V | YES | - | (w) |
| 0 | 12380 | READ | V | YES | - | (w) |

FIG.50

SCOREBOARD

| No. | ADDRESS | INSTRUCTION | Val | En | ORDER | ENABLE/DISABLE |
|---|---|---|---|---|---|---|
| 3 | 12380 | READ | V | YES | 2 | (d) |
| 2 | 12380 | WRITE | V | YES | 0 | (d) |
| 1 | 67380 | WRITE | V | YES | - | (w) |
| 0 | 12380 | READ | V | ->NO | - | (b) |

FIG.51

SCOREBOARD

| No. | ADDRESS | INSTRUCTION | Val | En | ORDER | ENABLE/DISABLE |
|---|---|---|---|---|---|---|
| 3 | 12380 | READ | V | YES | 2 | (d) |
| 2 | 12380 | WRITE | V | YES | ->- | (w) |
| 1 | 67380 | WRITE | V | YES | - | (w) |
| 0 | 12380 | READ | ->I | NO | - | (a) |

FIG.52

SCOREBOARD

| No. | ADDRESS | INSTRUCTION | Val | En | ORDER | ENABLE/DISABLE |
|---|---|---|---|---|---|---|
| 3 | 12380 | READ | V | YES | 2 | (d) |
| 2 | 12380 | WRITE | V | YES | - | (w) |
| 1 | 67380 | WRITE | V | YES | - | (w) |
| 0 | abcd70 | READ | ->V | ->YES | ->- | (w) |

FIG.53

MEMORY CONTROLLER AND MEMORY CONTROL SYSTEM

BACKGROUND OF THE INVENTION

This invention relates to a memory controller and a memory control method that are applied to a multiprocessor system, and more particularly to a memory controller and a memory control method that synchronize the data stored by a memory bank method.

Multiprocessor systems have been provided with a memory controller that manages and controls the memory-bank-type shared main memory and that executes access instructions (including data and addresses) in an out-of-order manner or a weak-order manner.

The memory controller has not only the function of independently controlling each bank memory corresponding to an independent memory area but also the function of replacing weak-order synchronization with strong-order synchronization temporarily. The methods related to such synchronizing operation are roughly divided as follows.

A first method is such that a buffer memory with a first-in, first-out (FIFO) function is used for address operation and the access instructions issued from the processors are executed in the order in which the address operations have been accepted. In this method, it is assumed that the system has the address bus separated from the data bus. Here, the address operation means the operation of the address bus.

A second method is such that a management table, called a scoreboard, that manages the progress of operation (the operating state of access instructions) in units of an independent control range of memory (bank memory units). With the method, once a synchronizing operation has been executed, the acceptance of an address operation is refused until the preceding operation has been completed. Namely, the synchronizing process is assured by retrying the synchronizing operation.

Because the second method shortens the latency in a read operation (read access operation) executed after a write operation (memory write access operation) and increases the memory use efficiency as compared with the first method, it improves the throughput of the system in actual operation.

These methods, however, have the following problems. The first method assures the execution of a synchronizing operation by using a buffer memory with an FIFO function for address operation. On the system, however, data operations (the operation of the data bus) are not always executed in the order of address operations. Therefore, the incompletion of the data operations causes a state where all of the FIFO buffer for address operation has been used, so that a state where the acceptance of an address operation is refused (retried) is liable to take place. In addition, the first method has an disadvantage in that when the data transfer for the preceding write operation has not been finished, all of the subsequent read operations cannot be executed, resulting in a larger latency in the read operation.

The second method manages the state of operations by the use of a management table, so that it can perform a memory access operation in an out-of-order manner or a weak order manner. But once the operations have been synchronized, the subsequent operations (or the operations satisfying the synchronizing conditions) cannot be executed until the preceding operation has been completed, leading to the problem of increasing the overhead of the system in the synchronizing process.

BRIEF SUMMARY OF THE INVENTION

The object of the present invention is to provide a memory controller and a memory control method that are capable of reducing the overhead in synchronizing a memory access instruction in a multiprocessor system.

The present invention relates to a memory controller applied particularly to a multiprocessor system, a system having a management table for managing the progress of memory access operation (the operating state of an access instruction), in order to reduce the overhead in executing a synchronizing operation having a high level of execution priority.

The management table holds synchronization flags set according to the acceptance of synchronizing operations in addition to the operation codes and addresses of the accepted access instructions. When accepting an access operation from a processor, the memory controller sets the operation code and address in the management table and resets the synchronization flag. At the time when the memory controller accepts a synchronizing operation, it set a synchronization flag. After completing the execution of the synchronizing operation, it resets the synchronization flag. With such a method, a subsequent operation can seemingly be accepted, which prevents the unit requesting the operation from retrying the request, reducing the overhead of the system.

Furthermore, the present invention is applied to a memory controller that controls a memory having a plurality of independently controllable memory areas, such as a memory bank system. A management table is provided for each memory area (each bank memory), shows the state of the progress of each operation, and holds the executable conditions for each operation. Furthermore, the management table has entries for synchronization flags used to distinguish the operations executed before the execution of a synchronizing operation from those executed after the execution of the synchronizing operation. The management table makes it possible to check to see if the operations before the execution of the synchronizing operation have been completed and accept subsequent operations even if the synchronizing operation has not been completed, thereby preventing the unit requesting the operation from retrying the request. When a subsequent synchronizing operation occurs before the execution of the present synchronizing operation has been completed, the acceptance of the request for a subsequent synchronizing operation will be refused and then the request will be retried.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 7A to 7B show examples of the two scoreboards and the synchronizing completion table in the first embodiment;

FIGS. 8A to 8C show examples of the two scoreboards and the synchronizing completion table in the first embodiment;

FIGS. 9A to 9C show examples of the two scoreboards and the synchronizing completion table in the first embodiment;

FIGS. 10A to 10C show examples of the two scoreboards and the synchronizing completion table in the first embodiment;

FIGS. 11A to 11C show examples of the two scoreboards and the synchronizing completion table in the first embodiment;

FIGS. 12A to 12C show examples of the two scoreboards and the synchronizing completion table in the first embodiment;

FIGS. 13A to 13C show examples of the two scoreboards and the synchronizing completion table in the first embodiment;

FIGS. 14A to 14C show examples of the two scoreboards and the synchronizing completion table in the first embodiment;

FIGS. 15A to 15C show examples of the two scoreboards and the synchronizing completion table in the first embodiment;

FIGS. 16A to 16C show examples of the two scoreboards and the synchronizing completion table in the first embodiment;

FIGS. 19A and 19B show examples of the scoreboard and the synchronizing completion table in the second embodiment;

FIGS. 20A and 20B show examples of the scoreboard and the synchronizing completion table in the second embodiment;

FIGS. 21A and 21B show examples of the scoreboard and the synchronizing completion table in the second embodiment;

FIGS. 22A and 22B show examples of the scoreboard and the synchronizing completion table in the second embodiment;

FIGS. 23A and 23B show examples of the scoreboard and the synchronizing completion table in the second embodiment;

FIGS. 27A and 27B show examples of the scoreboard and the synchronizing completion table in the third embodiment;

FIGS. 28A and 28B show examples of the scoreboard and the synchronizing completion table in the third embodiment;

FIGS. 29A and 29B show examples of the scoreboard and the synchronizing completion table in the third embodiment;

FIGS. 30A and 30B show examples of the scoreboard and the synchronizing completion table in the third embodiment;

FIGS. 31A and 31B show examples of the scoreboard and the synchronizing completion table in the third embodiment;

FIGS. 32A and 32B show examples of the scoreboard and the synchronizing completion table in the third embodiment;

FIGS. 33A and 33B show examples of the scoreboard and the synchronizing completion table in the third embodiment;

FIG. 46 shows examples of the scoreboard and the synchronizing completion table in the fifth embodiment;

FIG. 47 shows examples of the scoreboard and the synchronizing completion table in the fifth embodiment;

FIG. 48 shows examples of the scoreboard and the synchronizing completion table in the fifth embodiment;

FIG. 49 shows examples of the scoreboard and the synchronizing completion table in the fifth embodiment;

FIG. 50 shows examples of the scoreboard and the synchronizing completion table in the fifth embodiment;

FIG. 51 shows examples of the scoreboard and the synchronizing completion table in the fifth embodiment;

FIG. 52 shows examples of the scoreboard and the synchronizing completion table in the fifth embodiment;

FIG. 53 shows examples of the scoreboard and the synchronizing completion table in the fifth embodiment;

DETAILED DESCRIPTION OF THE INVENTION

Hereinafter, referring to the accompanying drawings, embodiments of the present invention will be explained.

Figure 1:
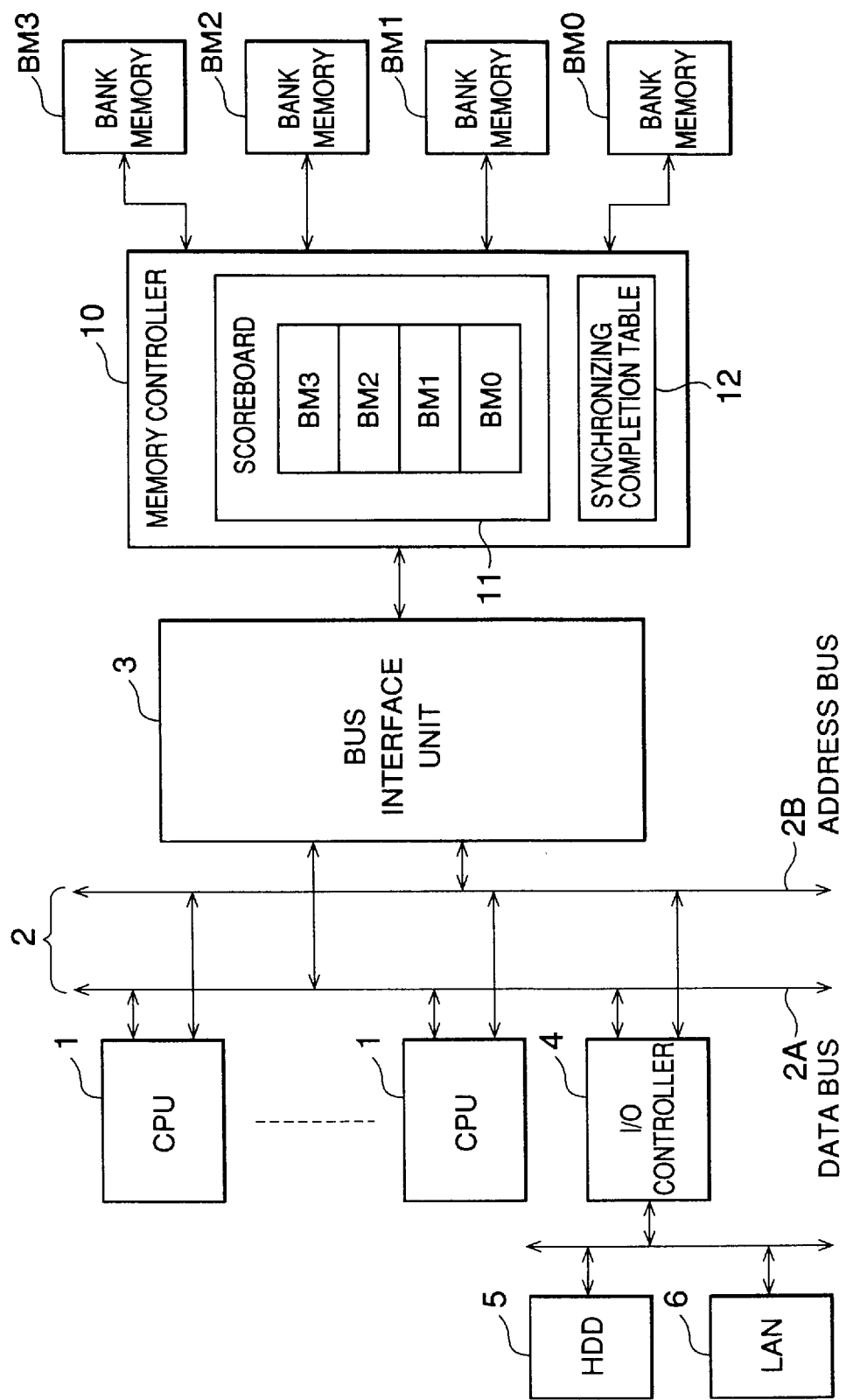
FIG. 1 is a block diagram of a computer system according to the present invention.
Figure 2:
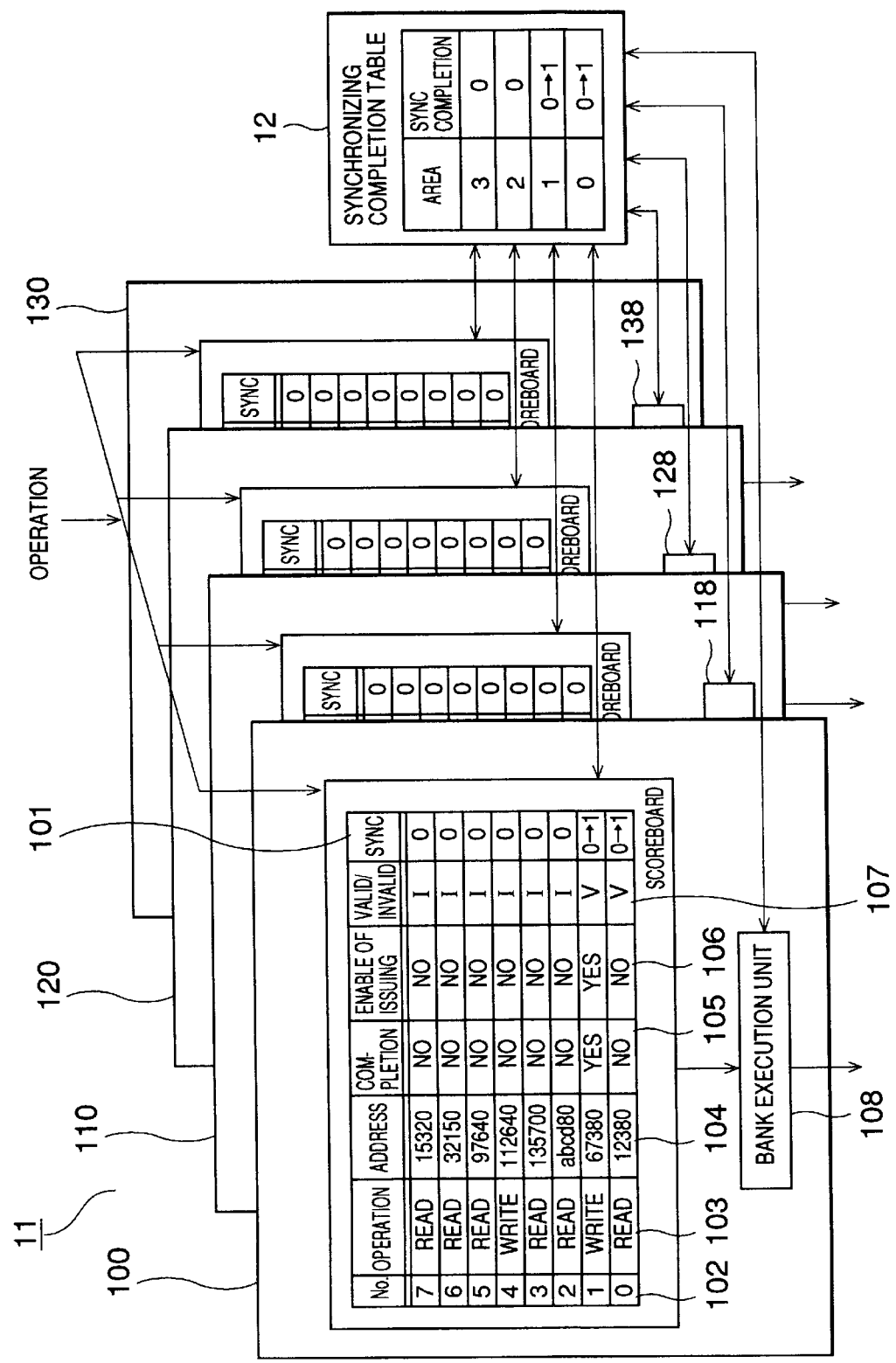
FIG. 2 is a conceptual diagram to help explain the structure of a scoreboard according to a first embodiment of the present invention.
Figure 3:
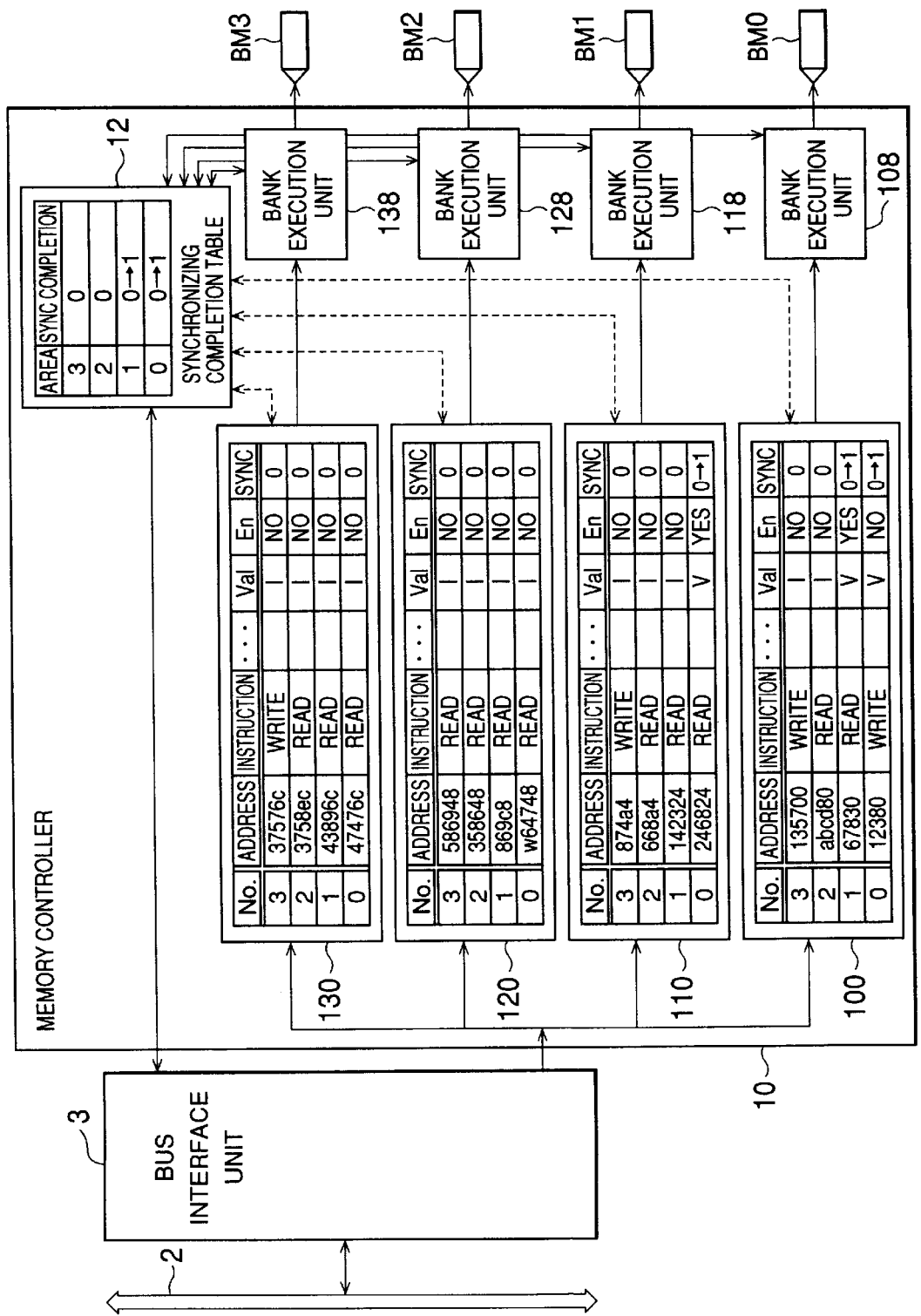
FIG. 3 is a block diagram of a memory controller of the first embodiment.
Figure 4:
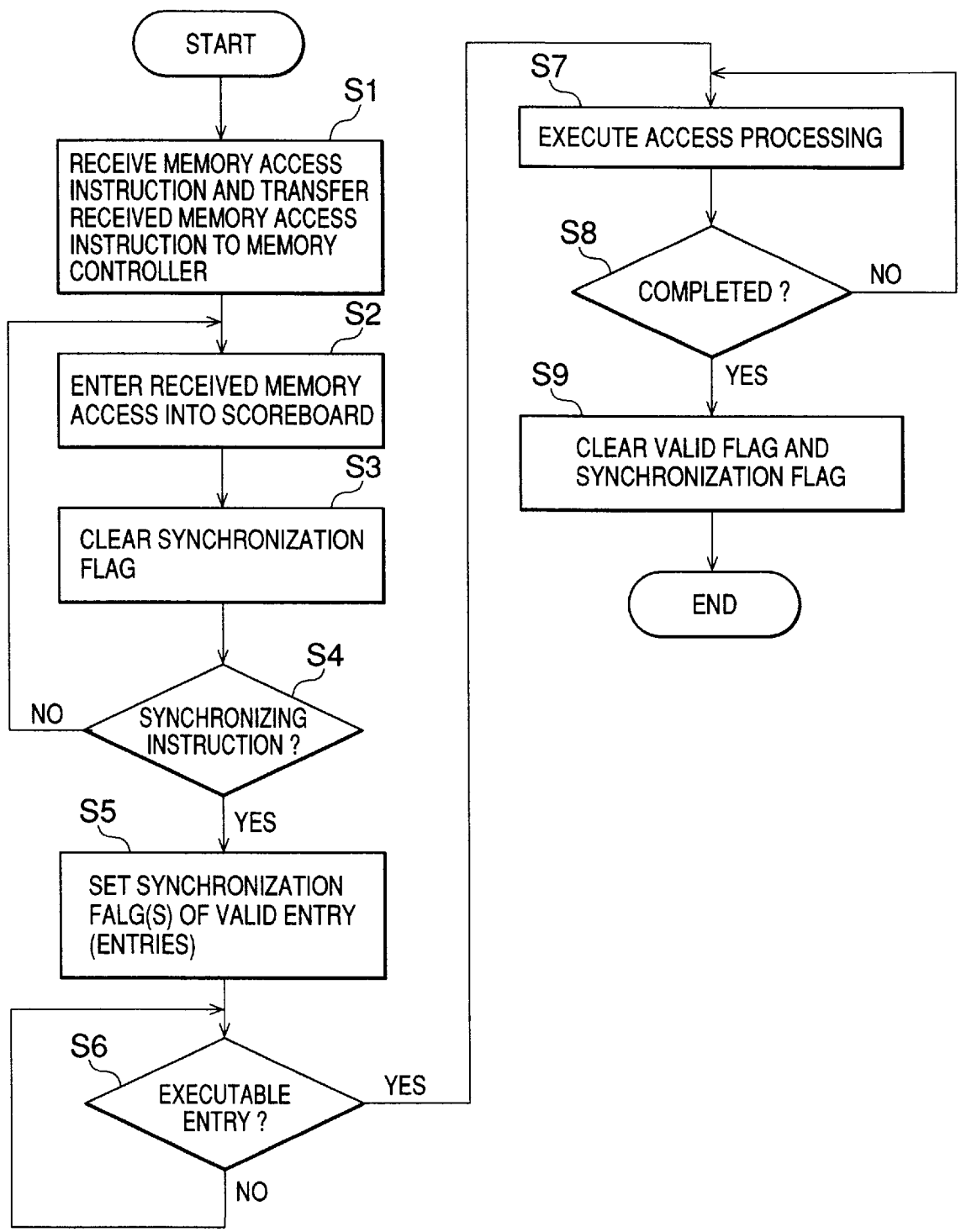
FIG. 4 is a flowchart to help explain the operation of the first embodiment.

FIG. 1 is a block diagram of a computer system according to the present invention. FIG. 2 is a conceptual diagram to help explain the structure of a scoreboard in connection with a first embodiment of the present invention. FIG. 3 is a block diagram of a memory controller of the first embodiment. FIG. 4 is a flowchart to help explain the operation of the first embodiment.

(System Configuration)

As shown in FIG. 1, the system of the present invention is a multiprocessor system having a plurality of processors 1 and has a memory having a memory bank structure consisting of a plurality of bank memories BM0 to BM3 as a shared main memory.

Each processor 1 issues an access instruction to a memory controller 10 via a bus interface unit 3 connected to a processor bus 2. In the processor bus 2, a data bus 2A is separated from an address bus 2B. Connected to the processor bus 2 is an I/O controller 4 that connects to I/O devices such as a hard disk unit (HDD) 5 and a LAN interface 6.

The bus interface unit 3, when receiving an memory access instruction from the processor 1, transfers it to the memory controller 10. The memory controller 10 has a scoreboard (management table) 11 for managing the accessing operation corresponding to an access instruction for each of the bank memories BM0 to BM3 and a synchronization completion table 12. The memory controller has a 4-way interleaving function of controlling each of the bank memories BM0 to BM3 as a memory area in the independent control range.

(Structure of Scoreboard)

The memory controller 10 has the scoreboard 11 serving as a management table and the synchronization completion table 12 as shown in FIG. 2. When it is assumed that memory areas acting as units of independent control range are bank memories, the scoreboard 11 is provided for each set of a plurality of bank memories BM0 to BM3. There may be a case where memory area 0 to memory area 3 are used in place of bank memories BM0 to BM3, respectively.

The scoreboard 11 is a table showing not only the state of the progress of an operation (the operating state of an access instruction) but also the executable conditions for each operation. The scoreboard 11 has entries for synchronization flags (SYNC flags) used to distinguish the operations executed before the execution of a synchronizing operation from those executed after the execution of the synchronizing operation. The synchronization completion table 12 is a table (SYNC completion) showing whether or not the synchronizing operation has been completed in each of the memory areas 0 to 3.

The scoreboard 11 of the present embodiment is composed of scoreboards 100, 110, 120, 130 corresponding to the four independent memory areas 0 to 3. Each scoreboard has entry number (No) 102, operation code 103, address 104, completion flag 105 indicating the completion of an operation, flag 106 indicating that an operation can be issued, valid flag 107 indicating that an entry is valid, and synchronization flag (SYNC flags) 101.

The entry number 102 is used to distinguish entries in the scoreboard. The operation code 103 is an entry for holding the type of an operation that the processor 1 requests (e.g., "Read" means a read operation and "Write" means a write operation). The address 104 is an entry for holding a memory address to be accessed. The completion flag 105 indicates that the issuing of the operation has been completed. In the valid flag 107, a flag V (Valid) is set when the corresponding entry is valid and a flag I (Invalid) is set when the corresponding entry is invalid. In other words, the entry corresponding to flag V will be issued in the future and the entry corresponding to flag I is an empty entry that is not issued.

A bank execution unit (indicated by numeral 108 in memory area 0) provided for each scoreboard not only generates the address of the entry selected from the relevant scoreboard, the DRAM (dynamic RAM) address constituting the bank memory and memory control signals, including RAS and CAS, but also performs processes, including the issuing of entries, which will be explained later. The bank execution units 108, 118, 128, and 138 provided on the scoreboards 100, 110, 120, and 130, respectively, are connected to the synchronizing completion table.

The synchronization flag (SYNC flag) is normally set (reset) to "0". In the synchronization completion table 12, a synchronization completion flag (SYNC completion) is provided for each of the independent memory areas 0 to 3 and is normally set to "0", meaning completion of the synchronization.

The memory controller 10, when receiving a synchronizing operation from a processor 1, sets the synchronization flags for all of the valid entries entered in the scoreboards 100, 110, 120, 130 at "1" and maintains the flags for the invalid entries at "0." At this point of time, the synchronization completion flags in the synchronization completion table 12 for the memory areas having valid entries are set to "1", whereas the synchronization completion flags for the memory areas having no valid entries (i.e., there is no operation waiting for execution) are maintained at "0."

When a subsequence operation different from a synchronizing operation is accepted, the synchronization flag in the scoreboard is set at "0," thereby distinguishing the accepted operation from the operations before the synchronizing operation. The synchronization completion flag in the synchronization completion table 12 is set to "0" at the time when the last operation for which the synchronization flag is set at "1" has disappeared from the corresponding memory area. As long as at least one of the synchronization completion flags in the synchronization completion table 12 for each memory area is at "1", the scoreboard permits only the operation whose synchronization flag is at "1" to be executed.

(First Embodiment)

Hereinafter, the operation of the first embodiment will be described briefly by reference to FIGS. 3 and 4.

As described earlier, the memory controller 10 of the embodiment controls the bank memories BM0 to BM3 corresponding to the four memory areas 0 to 3 with the help of the four-way interleaving function. The memory controller 10, as shown in FIG. 3, comprises execution units 108, 118, 128, 138 and scoreboards 100, 110, 120, 130, which are provided independently for the bank memories BM0 to BM3, respectively. In the scoreboards 100, 110, 120, and 130 of FIG. 3, a valid flag is represented by "Val," an issue enable flag by "En," and a synchronization flag by "SYNC."

As shown in FIG. 4, the bus interface unit 3, after receiving a memory access instruction from the processor bus 2, transfers it to the memory controller 10 (step S1). The memory controller 10, when receiving a memory access operation to one of the memory areas 0 to 3, makes entry in the relevant scoreboard (step S2).

As shown in FIG. 3, in the embodiment, the memory addresses are divided into bank memories BM0 to BM3 in units of four bytes. Specifically, the memory areas are allocated to the bank memories BM0 to BM3 in units of four bytes, starting with four bits (0, 4, 8, c) on the LSB side of each address. For the sake of convenience, the number of entries that can be entered in each scoreboard is assumed to be four.

The controller 10 sets the synchronization flag in each scoreboard to "0" at the time when an access operation is entered in the scoreboard (step S3). At this time, when a synchronizing operation is accepted, the synchronization flags for all valid entries are set at "1" at that time (steps S4 and S5). Specifically, the entry whose synchronization flag is at "1" is an entry made before the issuing of the synchronizing operation, which means that the entry is to be executed earlier than an entry whose synchronization flag is at "0."

FIG. 3 shows a case where a synchronizing operation has been accepted with two valid entries (an entry whose valid flag Val is at "V") in scoreboard 100 for bank BM0, one valid entry in scoreboard 110 for bank BM1, no valid entry in scoreboard 120 for bank BM2, and no valid entry in scoreboard 130 for bank BM3. Specifically, in the scoreboards 100, 110, the synchronization flags (SYNC) whose valid flag Val is at "V" change from "0" to "1" and the entries whose valid flag Val is "I" remain at "0" (remain unchanged).

At the same time, as for the synchronization completion flags (SYNC completion) corresponding to the individual memory areas 0 to 3 in the synchronization completion table 12, the values corresponding to memory area 0 (bank BM0) and memory area 1 (bank BM1) that have valid entries change from "0" to "1", whereas the values corresponding to memory area 2 (bank BM2) and memory area 3 (bank BM3) that have no valid entry remain unchanged at "0."

Furthermore, in the scoreboards 100, 110, at entry No. 1 for bank BM0 and entry No. 0 for bank BM1, the issue enable flag En is enabled (Yes) or executable, allowing the operation (read access) on the respective addresses to be executed (steps S6 and S7).

After the all access operations of the execution units E0, E1 have been completed, the controller 10 resets the enable flags En and synchronization flags to "No" or "0" (steps S8 and S9). At this time, because an entry whose synchronization flag has been set to "1" disappears from scoreboard 110 corresponding to bank BM1, the corresponding synchronization completion flag in the synchronization completion table 12 is also reset to "0."

When a subsequent memory access operation is requested, a synchronization flag of "0" is entered in the scoreboard for the memory area corresponding to the access instruction. Namely, the new subsequent operation is distinguished from the synchronizing operation whose synchronization flag has been set at "1" before the synchronizing operation. Furthermore, when a second synchronizing operation is requested in the state shown in FIG. 3, because there is an entry (memory areas 0, 1) whose synchronization completion flag is not at "0" in the synchronization completion table 12, the acceptance of the second synchronizing operation will be refused and the synchronizing operation be retried. If all of the synchronization flags are at "0", this means that the synchronizing operation has been completed. Therefore, the synchronization completion table 12 may be omitted in this case.

Next, the operation of the first embodiment will be explained in further detail.

Figure 5A:
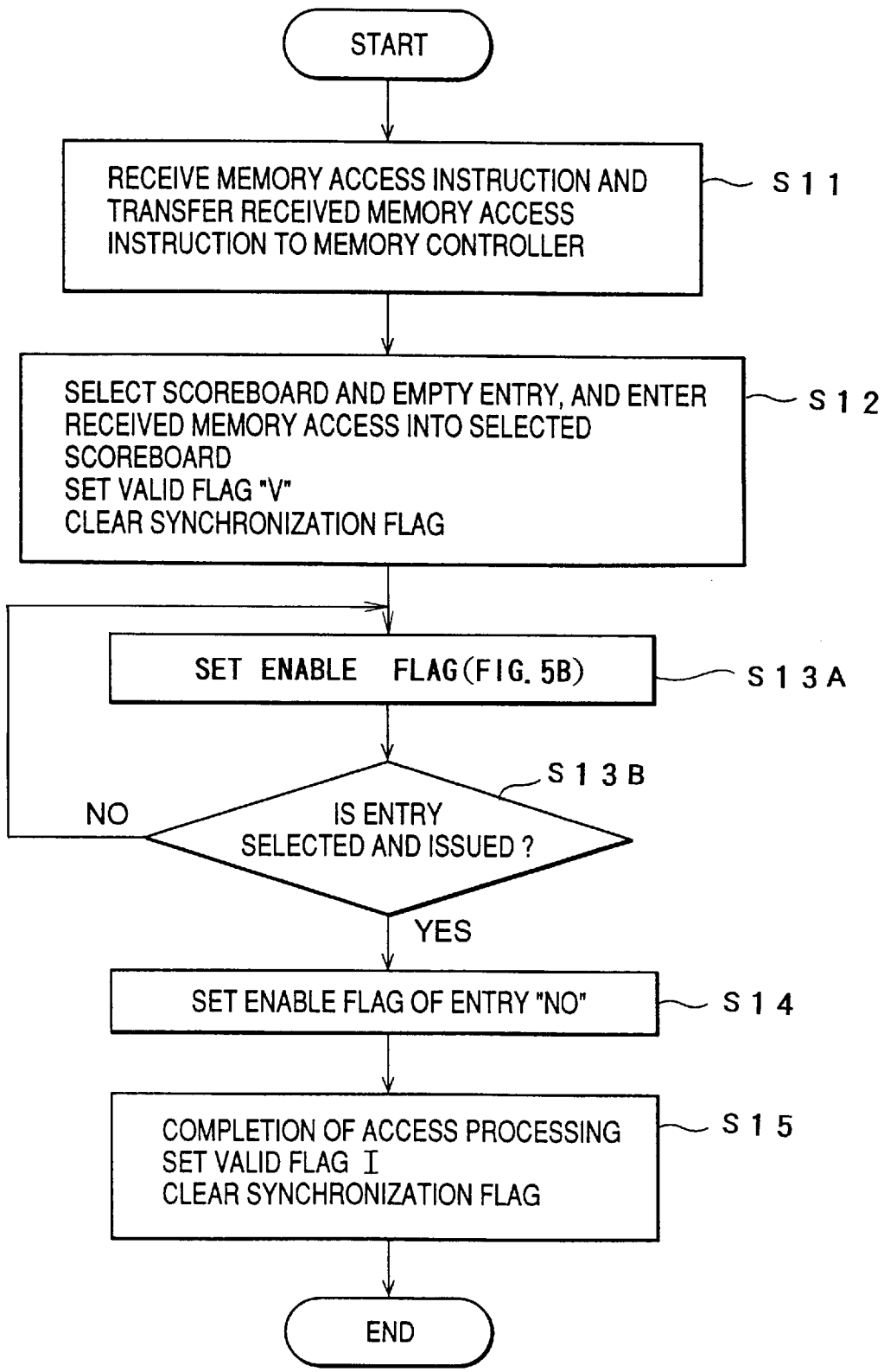
FIGS. 5A and 5B are flowcharts for the operation of the memory controller at the time when it has received a memory access instruction in the first embodiment.
Figure 5B:
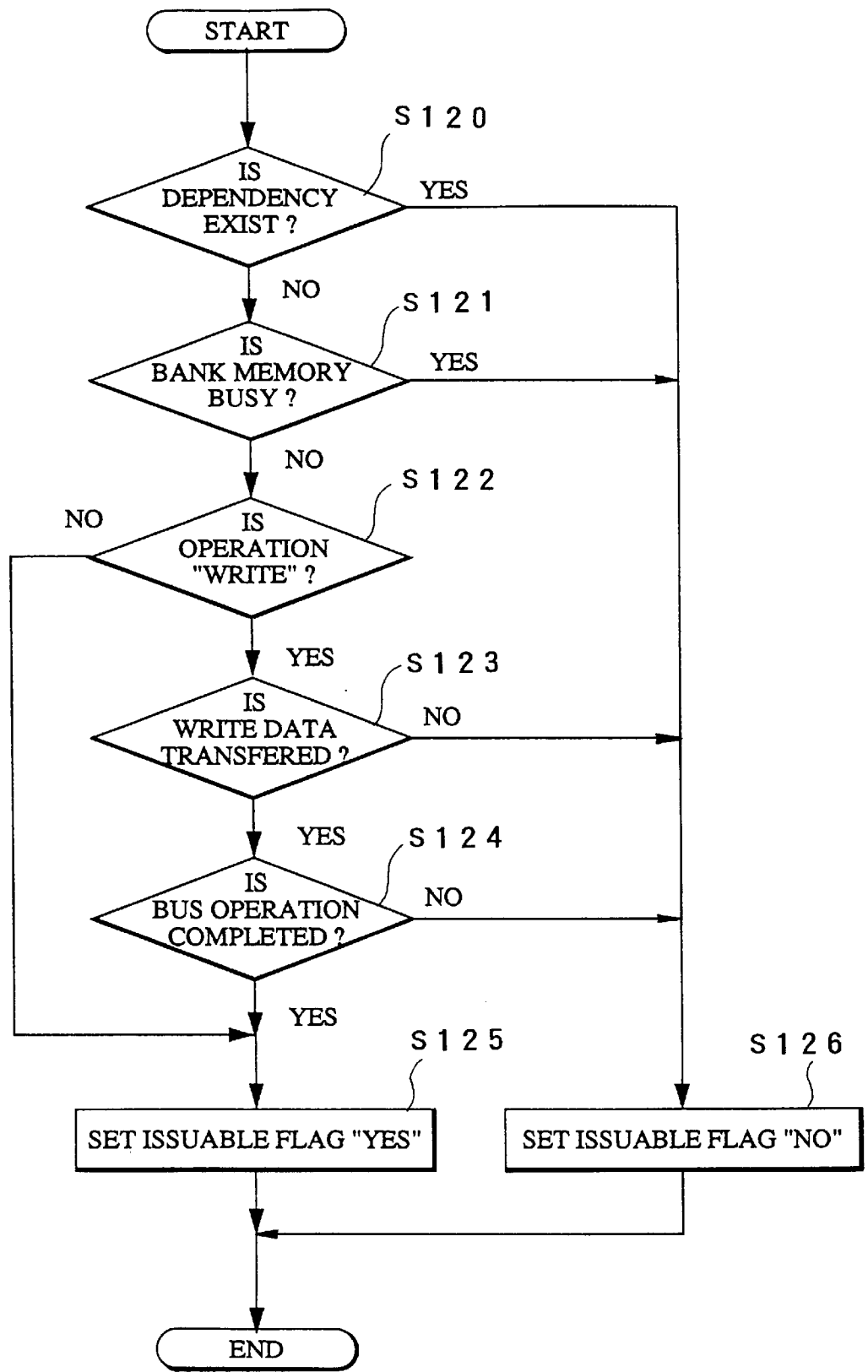

First, the processing in the case where a memory access instruction has been issued by the CPU 1 in the first embodiment will be explained by reference to FIG. 5.

The memory access instruction issued by the CPU 1 is sent to the bus interface unit 3 via the bus 2. The bus interface unit 3 transfers the received memory access instruction to the memory controller 10 (step S11).

When the received memory access instruction is a memory access instruction other than a synchronizing instruction, the memory controller 10 selects the corresponding scoreboard from the scoreboards 100, 110, 120, 130 on the basis of the address of the received memory access instruction. Furthermore, the memory controller 10 selects an entry whose valid flag is set at "I" (an empty entry) from all of the entries on the selected scoreboard. Thereafter, the memory controller 10 enters the transferred memory access instruction in the selected entry (step S12).

When entering the memory access instruction, the memory controller 10 not only enters the operation code and address of the memory access instruction but also sets the valid flag to "I" for the entry in which the instruction is entered and resets the synchronization flag to "0."

When receiving a synchronizing instruction from the bus interface unit 3, the memory controller 10 sets to "1" the synchronization flags for all of the entries whose valid flag entered in the selected scoreboard has been set to "V."

Furthermore, under the control of the bank execution units 108, 118, 128, 138, the memory controller 10 selects an entry from the scoreboard and issues the instruction in the entry.

When the entry (memory access instruction) entered at step S12 has been selected and the instruction in the entry has been issued (step S13, YES), the enable flag for the selected entry is set to "NO" (step S14). The issued memory access instruction is executed by the bus interface unit 3, memory controller 10, and the bank execution units.

After the processing of the memory access instruction has been completed, the memory controller 10 sets to "I" the valid flag stored in the entry for the executed memory access instruction in the scoreboard and resets the synchronization flag to "0" (step S15). By these processes, the entry in which the executed memory access instruction has been entered is set free.

Through the processing described above, the memory access instruction sent from the CPU 1 is executed.

Figure 6:
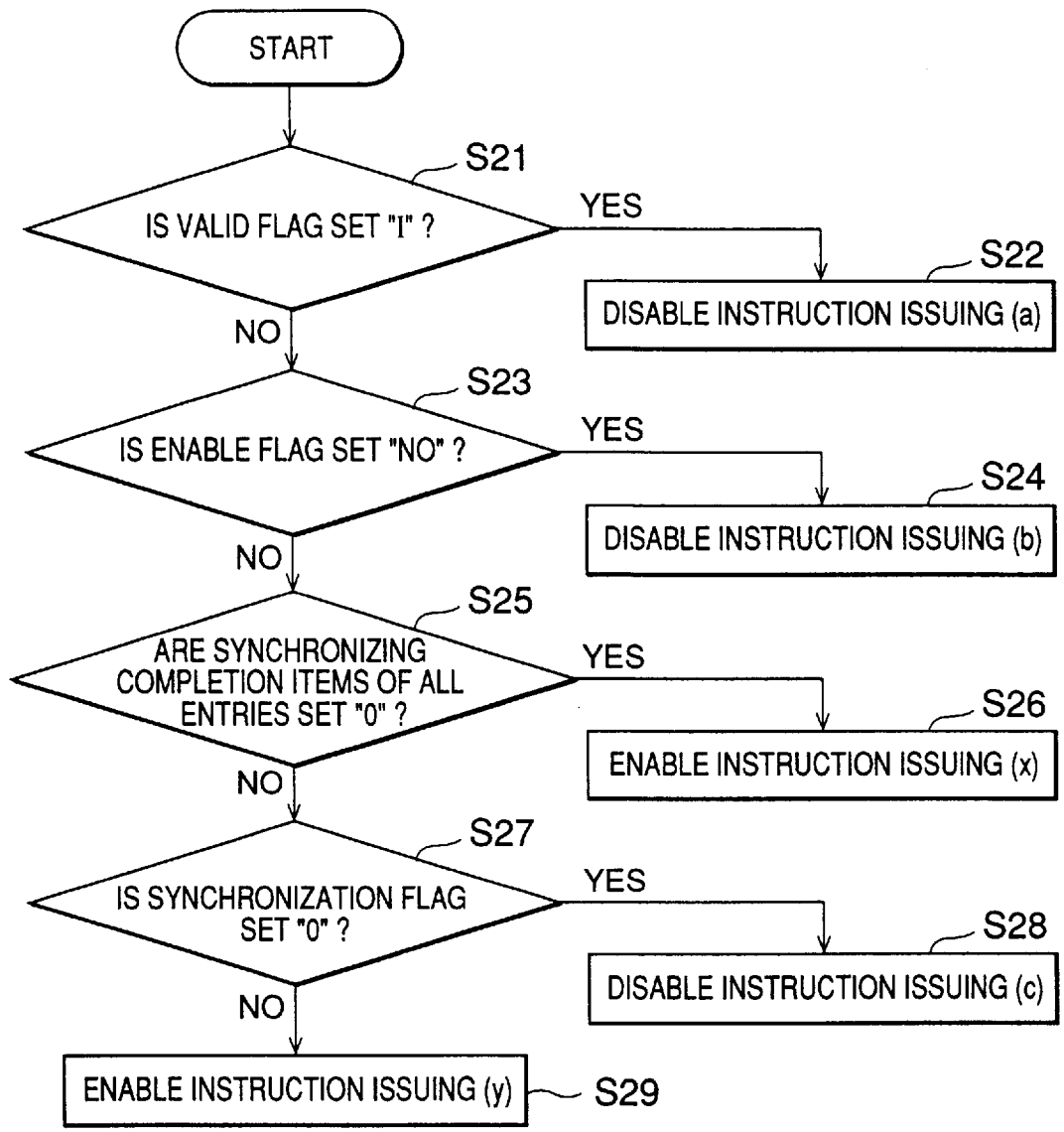
FIG. 6 is a flowchart for the determination process for the issuing of an instruction at the bank execution unit of the first embodiment.

Next, the process of issuing instructions at each of the bank execution units 108, 118, 128, and 138 provided so as to correspond to the scoreboards 100, 110, 120, and 130, respectively, will be described by reference to FIG. 6.

Regarding the entry in which the memory access instruction to be issued has been entered on the scoreboard, the bank execution unit first determines whether or not the valid flag for the relevant entry is at "I" (step S21). When the valid flag for the relevant entry is at "I," the bank execution unit determines that the memory access instruction in the relevant entry cannot be issued because the relevant entry is invalid (step S22).

When the valid flag for the relevant entry is at "V" (step S21, NO), the bank execution unit determines whether or not the enable flag for the relevant entry is at "NO" (step S23). When the enable flag for the relevant entry is at "NO," the bank execution unit determines that the instruction in the relevant entry has been issued already or is not satisfied with the conditions of issuing and does not issue the memory access instruction in the relevant entry (step S24).

When the enable flag for the relevant entry is at "YES" (step S23, NO), the bank execution unit determines whether or not the item "SYNC COMPLETION" has 0s for all of the areas in the synchronizing completion table 12 (step S25). Since the state where the item "SYNC COMPLETION" has 0s for all of the areas means that a synchronizing instruction has not been sent from the CPU 1, the bank execution unit determines that the memory access instruction in the relevant entry can be issued (step S26).

When the item "SYNC COMPLETION" has a 1 for any of the areas in the synchronizing completion table 12 (step S25, NO), the bank execution unit determines whether or not the synchronization flag for the relevant entry is at "0" (step S27). When the synchronization flag for the relevant entry is at "0," because the instruction in the relevant entry is a memory access instruction entered in the scoreboard after the memory controller 10 has received a synchronizing instruction, the bank execution unit does not issue the memory access instruction (step S28).

When the synchronization flag is at "1" (step S27, NO), because the memory access instruction entered in the relevant entry is a memory access instruction entered before a synchronizing instruction has been sent, the bank execution unit determines that the memory access instruction in the relevant entry can be issued (step S29). After the above determination processing has performed on the all entries of the scoreboard, the bank execution unit selects one entry from one or more issuable entries and performs the issue processing of the relevant entry.

Explained next will be the processing of the memory controller 10 in the first embodiment at the time when the CPU 1 sends the following instructions in ascending order:

(1) Write 12380
(2) Read 246824
(3) Read 67830
(4) SYNC
(5) Read abc70

FIGS. 7A to 16C show the data items entered in the scoreboard 110 provided for area 1, the scoreboard 100 provided for area 0, and the synchronizing completion table 12.

In FIGS. 7A to 16C, the item indicating "ISSUE ENABLE/DISABLE" of the instruction in each entry holds such information as represents the determination result of the bank execution unit in FIG. 6 as follows: (a) corresponds to the determination result at step S22 of FIG. 6; (b) corresponds to the determination result at step S24; (x) corresponds to the determination result at step S26; (c) corresponds to the determination result at step S28; and (y) corresponds to the determination result at step S29. This makes it easier to understand the operation. Actually, however, the item has only to hold information just indicating "ISSUE ENABLE/DISABLE" of an instruction.

FIGS. 7A to 7C show the initial states of the scoreboards 100, 110, and synchronizing completion table 12. Therefore, all of the entries in the scoreboards 100, 110 are unused (empty). In all of the entries under the item "ISSUE ENABLE/DISABLE" on the scoreboards 100, 110, data indicating ISSUE DISABLE has been entered. This corresponds to (a) which means that the entries are invalid when the bank execution units 108, 118 execute the processing of FIG. 6. Consequently, there is no entry that can be issued.

FIGS. 8A to 8C show the scoreboards 100, 110, and synchronizing completion table 12 in the case where instruction (1) "Write 12380" has been transferred from the bus interface unit 3. The memory controller 10 selects empty entry No. 0 from the scoreboard 100 corresponding to the area 0. The area 0 is assigned the predetermined addresses which includes an address 12380 assigned by the instruction "Write 12380". The memory controller 10 enters this instruction in the selected entry. The scoreboard 110 has no issuable entry, whereas entry No. 0 on the scoreboard 100 can be issued.

FIGS. 9A to 9C show the scoreboards 100, 110 and synchronizing completion table 12 in the case where the memory controller 10 has received instruction (2) "Read 246824" thereafter. The memory controller 10 selects empty entry No. 0 from the scoreboard 110 for area 1 corresponding to the address of instruction "Read 246824" and enters the instruction in the entry. Entry No. 0 on each of the scoreboards 100, 110 can be issued.

FIGS. 10A to 10C show the scoreboards 100, 110 and synchronizing completion table 12 in the case where the memory controller 10 has received instruction (3) "Read 67830" thereafter. The memory controller 10 selects empty entry No. 1 from the scoreboard 100 for area 0 corresponding to the address of instruction "Read 67830" and enters the instruction in the entry. Entry No. 0 and entry No. 1 on the scoreboard 100 and entry No. 0 on the scoreboard 110 can be issued.

FIGS. 11A to 11C show the scoreboards 100, 110 and synchronizing completion table 12 in the case where the bank execution unit 108 has selected entry No. 0 from the issuable entries on the scoreboard 100 and issued the entry. In entry No. 0 under the item "ISSUE ENABLE/DISABLE" on the scoreboard 100, information indicating "ISSUE DISABLE" has been entered. This corresponds to (b) which means that the instruction has issued already. Entry No. 0 on each of the scoreboards 100, 110 can be issued.

FIGS. 12A to 12C show the scoreboards 100, 110 and synchronizing completion table 12 in the case where the memory controller 10 has received synchronizing instruction (4) "SYNC" from the bus interface unit 3. In entry No. 0 and entry No. 1 on the scoreboard 100 and entry No. 0 on the scoreboard 100 under the item "SYNC," "1" is set. In entry No. 0 on the scoreboard 100 and entry No. 0 on the scoreboard 110 under the item "ISSUE ENABLE/ DISABLE," information indicating "ISSUE ENABLE" has been entered. This corresponds to (y) which means that the instruction is an instruction entered before the synchronizing instruction has been inputted. In the entries corresponding to area 0 and area 1 in the synchronizing completion table 12, too, "1" is set.

FIGS. 13A to 13C show the scoreboards 100, 110 and synchronizing completion table 12 in the case where the memory controller 10 has received instruction (5) "Read abcd70" thereafter. The memory controller 10 selects empty entry No. 2 from the scoreboard 100 for area 0 corresponding to the address of instruction "Read abcd70" and enters the instruction in the entry. Only entry No. 1 on the scoreboard 100 can be issued.

FIGS. 14A to 14C show the scoreboards 100, 110 and synchronizing completion table 12 in the case where the bank execution unit 108 selects issuable entry No. 1 on the scoreboard 100 and issues the entry and the bank execution unit 118 selects issuable entry No. 0 on the scoreboard 110 and issues the entry. In each of the issued entries under the item "En", "YES" is changed to "NO."

FIGS. 15A to 15C show the scoreboards 100, 110 and synchronizing completion table 12 in the case where the instruction in entry No. 1 on the scoreboard 100 has been completed. In entry No. 0 and entry No. 1 under the item "Val" on the scoreboard 100, "V" is changed to "I" and under the item "SYNC," these entries are reset to "0." The entry corresponding to area 0 in the synchronizing completion table 12 is reset to "0."

FIGS. 16A to 16C show the scoreboards 100, 110 and synchronizing completion table 12 in the case where the instruction in entry No. 0 on the scoreboard 110 has been completed. In entry No. 0 under the item "Val" on the scoreboard 110, "V" is changed to "I" and under the item "SYNC," the entry is reset to "0." The entry corresponding to area 1 in the synchronizing completion table 12 is reset to "0."

The above-described processes enable the memory controller 10 to prevent such a process ignoring the synchronizing instruction as executes entry No. 2 (instruction (5)) entered in the scoreboard 100 before entry No. 1 (instruction (3)) on the scoreboard 100 or entry No. 0 (instruction (2)) on the scoreboard 110 entered before the acceptance of synchronizing instruction (4) "SYNC" has been selected and issued.

(Second Embodiment)

Figure 17:
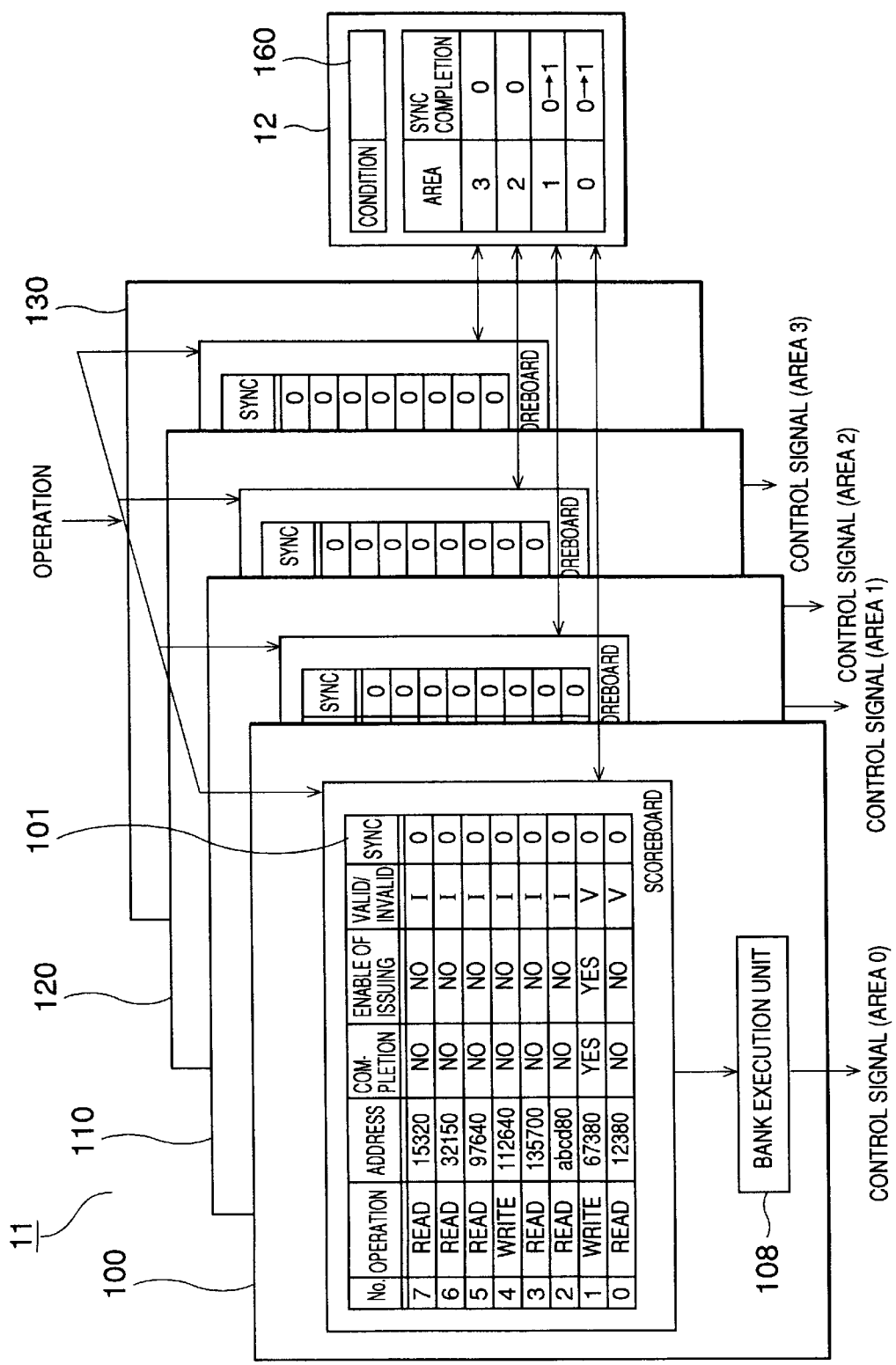
FIG. 17 is a conceptual diagram to help explain the structure of a scoreboard according to a second embodiment of the present invention.

As shown in FIG. 17, a second embodiment of the present invention is such that an entry 160 for synchronization conditions is added to a synchronization completion table 12. The entry 160 is an item indicating the synchronization condition for a request from the same requester (processor) or for the same address (here, the condition is assumed to be for the same address). The remaining system structure and the configuration of the memory controller 10 are the same as those in the first embodiment.

The above-described structure achieves the function of executing a subsequent instruction (subsequent operation) not satisfying the synchronization condition without being affected by the synchronizing operation. In an operation meeting the synchronization condition, the operation executed after the synchronizing operation is inhibited from being executed earlier than the operation executed before the synchronizing operation. In an operation that does not meet the synchronization condition, a normal operation (an out-of-order process or a weak-order process) is executed. When a subsequent synchronizing operation is requested before the synchronization has been completed, the acceptance of the subsequent synchronizing operation will be refused and the synchronizing operation be retried.

Hereinafter, the second embodiment will be described briefly by reference to FIG. 17.

The second embodiment is characterized by adding the synchronization condition entry 160 to the synchronization completion table 12. In the entry 160, a synchronization condition is set. For example, the synchronization condition may be "until all of the write operations have been completed" or "until all of the read and write operations have been completed."

In the second embodiment, a synchronizing operation under the synchronization condition that "a subsequent read and write operations are inhibited until all of the read and write operations with respect to the same address have been completed" is assumed in a system defining an operation (incoherent operation) that does not assure the order in which the data is read and write from and into the same address and an operation (coherent operation) that assures the order.

The memory controller 10 executes an incoherent operation (memory access) in an out-of-order manner (an out-of-order process) totally independently of other operations until a synchronizing operation has been issued. When a synchronizing operation is issued, the synchronization flags (SYNC flags) in all of the valid entries entered in the scoreboard are set to "1" as with the first embodiment. Similarly, The synchronization completion flags (SYNC completion) in the synchronization completion table 12 corresponding to the scoreboard having valid entries are also set to "1."

In the state of FIG. 17, because scoreboard 100 in memory area 0 and scoreboard 110 in memory area 1 have valid entries, the synchronization completion flags in the synchronization completion table 12 are set to "1." Furthermore, because scoreboard 120 in memory area 2 and scoreboard 130 in memory area 3 have no valid entry, the relevant synchronization completion flags are maintained at "0."

The synchronization flags in the valid entries in the memory areas 0 and 1 are set to "1" and the synchronization flags in the invalid entries are kept at "0." At the same time, in the entry 160 for synchronization condition in the synchronization completion table 12, the synchronization condition that "a subsequent read and write operations are inhibited until all of the read and write operations have been completed with respect to the same address" is entered.

Under the synchronization condition, a subsequent read operation is not issued when an entry whose synchronization flag is at "1" has the same address, and is issued when the entry does not have the same address. In this case, after the synchronizing operation of the scoreboard corresponding to the address has been completed and the entry whose synchronization flag is at "1" has disappeared, the entries entered and to be entered in the scoreboard can be issued as soon as the issuing conditions have been satisfied, regardless of whether the synchronizing operation has been completed in another scoreboard. Namely, in these areas, memory access can be executed under the same conditions as when there is no synchronizing operation.

As with the first embodiment, when at least one of the synchronization completion flags in the synchronization completion table 12 is at "1" (in the course of the synchronizing process), the acceptance of a second synchronizing operation will be refused and the synchronizing operation be retried. When all of the synchronization flags are at "0," this means that all of the synchronizing operations have been completed. Therefore, the synchronization completion table 12 may be omitted.

Next, the operation of the second embodiment will be explained in further detail.

The processing in the case where a memory access instruction has been issued by the CPU 1 in the second embodiment is similar to the processing in the first embodiment of FIG. 17, so a detailed explanation of the second embodiment will be omitted.

Figure 18:
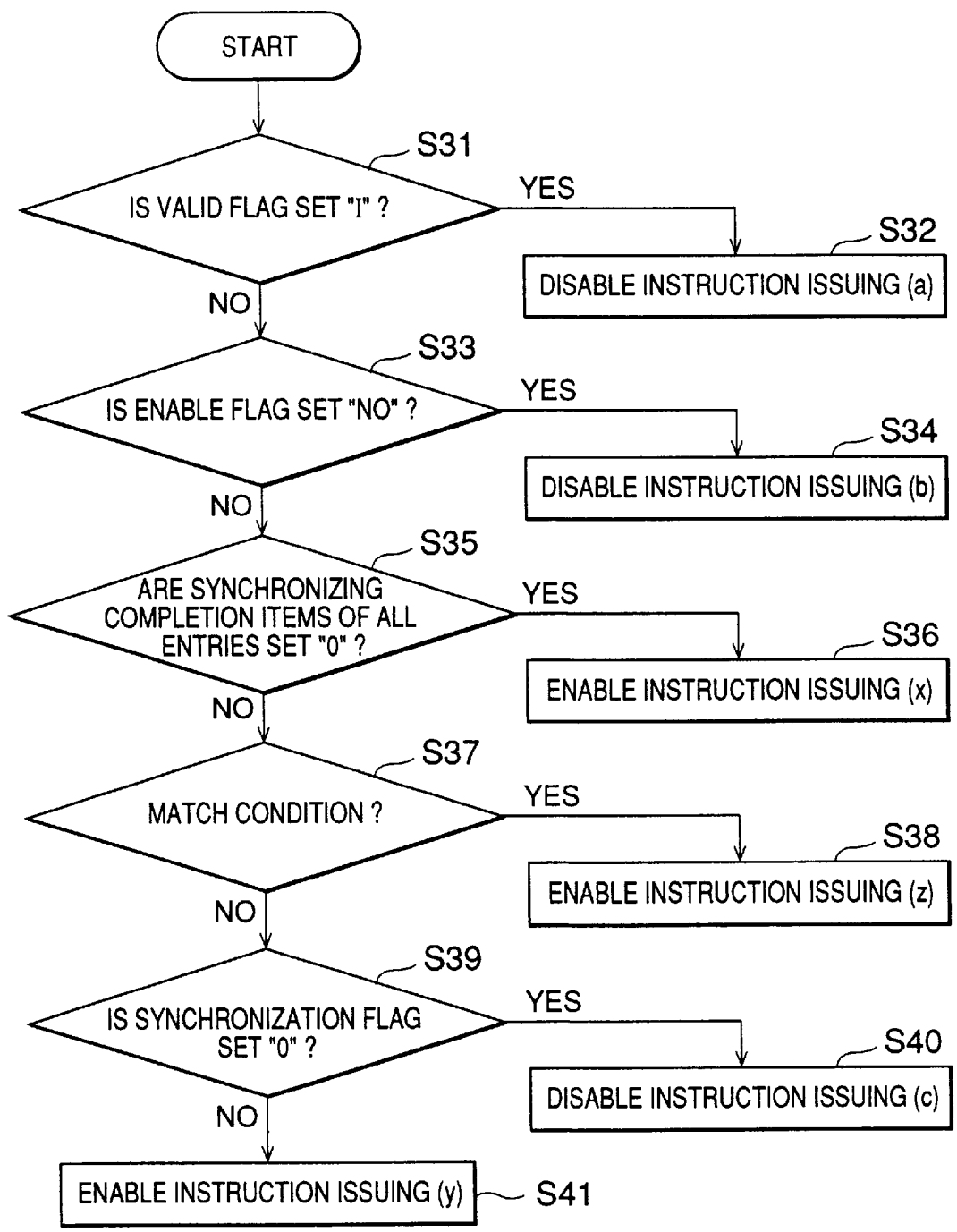
FIG. 18 is a flowchart for the determination process for the issuing of an instruction at the execution bank unit of the second embodiment.

Next, the process of issuing instructions at each of the bank execution units 108, 118, 128, and 138 provided so as to correspond to the scoreboards 100, 110, 120, and 130, respectively, will be described by reference to FIG. 18.

Regarding the entry in which the memory access instruction to be issued has been entered on the scoreboard, the bank execution unit first determines whether or not the valid flag for the relevant entry is at "I" (step S31). When the valid flag for the relevant entry is at "I," the bank execution unit determines that the memory access instruction in the relevant entry cannot be issued because the relevant entry is invalid (step S32).

When the valid flag for the relevant entry is at "V" (step S31, NO), the bank execution unit determines whether or not the issuing flag for the relevant entry is at "NO" (step S33). When the issuing flag for the relevant entry is at "NO," the bank execution unit determines that the instruction in the relevant entry has been issued already and do not issue the memory access instruction in the relevant entry (step S34).

When the issuing flag for the relevant entry is at "YES" (step S33, NO), the bank execution unit determines whether or not the item "SYNC COMPLETION" has 0s for all of the areas in the synchronizing completion table 12 (step S35). Since the state where the item "SYNC COMPLETION" has 0s for all of the areas means that a synchronizing instruction has not been sent from the CPU 1, the bank execution unit determines that the memory access instruction in the relevant entry can be issued (step S36).

When the item "SYNC COMPLETION" has a 1 for any of the areas in the synchronizing completion table 12 (step S35, NO), the bank execution unit determines whether or not the entry satisfies the synchronizing condition (step S37). When the entry does not satisfy the synchronizing condition in the synchronizing completion table 12, the bank execution unit determines that the synchronizing instruction process is not necessary and the memory access instruction in the relevant entry can be executed (step S38).

When the entry satisfies the synchronizing condition (step S37, YES), the bank execution unit determines whether or not the synchronization flag for the relevant entry is at "0" (step S39). When the synchronization flag for the relevant entry is at "0," because the instruction in the relevant entry is a memory access instruction entered in the scoreboard after the memory controller 10 has received a synchronizing instruction, the bank execution unit does not issue the memory access instruction (step S40).

When the synchronization flag is at "1" (step S39, NO), because the memory access instruction entered in the relevant entry is a memory access instruction entered before a synchronizing instruction has been sent, the bank execution unit determines that the memory access instruction in the relevant entry can be issued (step S41).

Explained next will be the processing of the memory controller 10 in the second embodiment at the time when the CPU 1 sends the following instructions in ascending order:
(1) Read 12380
(2) SYNC
(3) Write 67830
(4) Write 12380

FIGS. 19A to 23B show the data items entered in the scoreboard 100 provided for area 0 and the synchronizing completion table 12.

Here, it is assumed that the condition that "a subsequent read and write operation is inhibited until all of the read and write operations with respect to the same address have been completed" is determined to be the synchronizing condition. This means that when an instruction with respect to the same address exists before a SYNC instruction (the synchronization flag is at "1") in a subsequent operation (the synchronization flag is "0") in the course of processing the synchronizing instruction, the instruction cannot be issued, whereas when such an instruction does not exist, the instruction can be issued.

In FIGS. 19A to 23B, the item indicating "ISSUE ENABLE/DISABLE" of the instruction in each entry holds such information as represents the determination result of the bank execution units in FIG. 18 as follows: (a) corresponds to the determination result at step S32 of FIG. 18; (b) corresponds to the determination result at step S34; (x) corresponds to the determination result at step S36; (c) corresponds to the determination result at step S40; and (y) corresponds to the determination result at step S41. This makes it easier to understand the operation. Actually, however, the item has only to hold information just indicating "ISSUE ENABLE/DISABLE" of an instruction.

FIGS. 19A and 19B show the initial states of the scoreboard 100 and synchronizing completion table 12. Therefore, all of the entries in the scoreboard 100 are unused (empty). In all of the entries under the item "ISSUE ENABLE/DISABLE" on the scoreboard 100, data indicating ISSUE DISABLE has been entered. This corresponds to (a) which means that the entries are invalid when the bank execution unit 108 executes the processing of FIG. 18. Consequently, there is no entry that can be issued.

FIGS. 20A and 20B show the scoreboard 100 and synchronizing completion table 12 in the case where instruction (1) "Read 12380" has been transferred from the bus interface unit 3. Here, the memory controller 10 selects empty entry No. 0 from the scoreboard 100 for area 0 corresponding to the address of instruction "Read 12380" and enters the instruction in the entry. The entry No. 0 on the scoreboard 100 can be issued.

FIGS. 21A and 21B show the scoreboard 100 and synchronizing completion table 12 in the case where the memory controller 10 has received synchronizing instruction (2) "SYNC." The memory controller 10 sets the synchronization flag in the valid entry ("V" under the item "Val") to "1" on the scoreboard 100. The memory controller 10 also sets the synchronization flag in the entry corresponding to area 0 i.e. the synchronization flag is changed "0" to "1". The entry No. 0 can be issued by the bank execution unit 108.

FIGS. 22A and 22B show the scoreboard 100 and synchronizing completion table 12 in the case where the memory controller 10 has received instruction (3) "Write 67380" thereafter. The memory controller 10 selects empty entry No. 1 from the scoreboard 100 corresponding to the area 0. The area 0 is assigned the predetermined addresses which includes an address assigned by the instruction "Write 67380". The memory controller 10 enters the instruction in the selected entry. Entry No. 0 and entry No. 1 on the scoreboard 100 can be issued.

FIGS. 23A and 23B show the scoreboard 100 and synchronizing completion table 12 in the case where the memory controller 10 has received instruction (4) "Write 12380" thereafter. The memory controller 10 selects empty entry No. 2 from the scoreboard 100 for area 0 corresponding to the address of instruction "Write 12380" and enters the instruction in the entry. Only entry No. 0 and entry No. 1 on the scoreboard 100 can be issued. The reason for this is that the entered instruction (4), a write instruction, is associated with the same address as the already entered instruction (1), so the write instruction satisfies the synchronizing condition, preventing instruction (4) from being issued.

(Third Embodiment)

A third embodiment of the present invention is a system that achieves the function of processing a plurality of synchronization instructions simultaneously and comprises a memory controller 10 having scoreboards provided with synchronization flags (SYNC flags) of multiple levels and a synchronization completion table provided with synchronization completion flags (SYNC completion) of multiple levels. Until all of the synchronization levels being used, a subsequent synchronizing operation is not be retried.

In the third embodiment, the synchronizing process is executed in the order in which the synchronizing operation is executed. Specifically, in a case where three synchronizing operations A, B, and C have been accepted, they are executed in this order: the operations accepted before synchronizing operation A, the operations accepted between synchronizing operations A and B, the operation accepted between synchronizing operations B and C, and the operation accepted after synchronizing operation C. To achieve this function, flags indicating preceding synchronizing operations are provided in the synchronization completion table 12. For instance, a preceding synchronizing operation next to B in the synchronization completion table 12 is marked with B with respect to A and C. "Null" is set for A to indicate that there is no preceding synchronizing operation. When A has been completed, the B's preceding synchronizing operation is given "Null." Similarly, when the preceding synchronizing operation has been completed, the preceding synchronizing operation of the entry is given "Null", thereby achieving the above function.

Hereinafter, the third embodiment will be described briefly by reference to FIG. 24.

Here, it is assumed that the synchronization flag 102 has four levels 0 to 3 for each entry. The synchronization completion flag for each entry (corresponding to each of memory areas 0 to 3) in the synchronization completion table 12 is assumed to have four levels. A synchronization (SYNC) read pointer 161 indicates which level is being executed. A synchronization write pointer 162 indicates a synchronization level which is executed after the level indicated by the synchronization read pointer 161 is executed.

Since the synchronizing operation is processed in the order of acceptance, these pointers 161 and 162 are controlled in the same way as an ordinary FIFO buffer. Each scoreboard issues only operations whose synchronization flag corresponding to the synchronizing operation specified by the read pointer 161 is at "1."When in all of the banks, the entry of the level specified by the synchronization read pointer 161 has disappeared, the pointer increments by one.

When all of the synchronization completion flags in the synchronization completion table 12 are at "0", all of the synchronizing operations have been completed and all of the synchronization flags in all of the scoreboards 100, 110, 120, and 130 are at "0."Therefore, an operation is issued according to the rules followed in the case where no synchronization is used. At the time when a synchronizing operation is received, if at least one of the synchronization levels is unused, the synchronizing operation is accepted without being retried and a normal synchronizing process is executed. When all of the synchronization levels are being used, a subsequent synchronizing operation will be retried.

Figure 24:
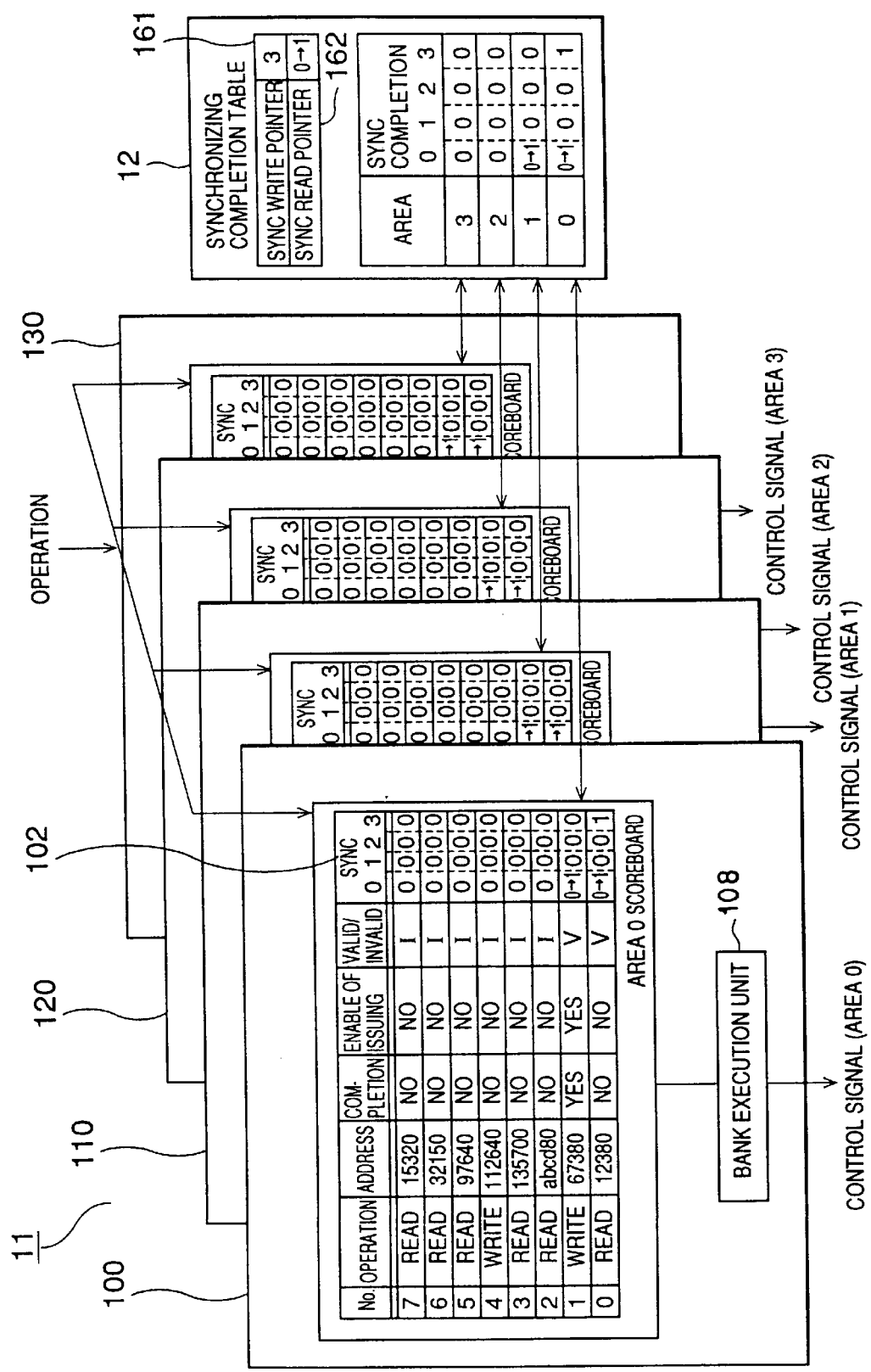
FIG. 24 is a conceptual diagram to help explain the structure of a scoreboard according to a third embodiment of the present invention.

FIG. 24 shows a case where a synchronizing operation is accepted, with synchronization level 3 being used, synchronization levels 0, 1, and 2 being unused, scoreboards 100, 110, 120 in memory areas 0, 1, and 2 having valid entries, and scoreboard 130 in memory area 3 having no valid entry. The levels 1 and 2 of all of the individual synchronization flags are set to "0" and are not used. As for level 3, only synchronization flag for entry No. 0 in memory area 0 is at "1" and all of the synchronization flags in the other memory areas are at "0." This means that it is only entry No. 0 in memory area 0 that is unused in the case of the operations before the issuing of the synchronizing operation of level 3.

The synchronization read pointer 161 in the synchronization completion table 12 indicates that level 3 is being processed at present. A new synchronizing operation is entered in level 0 specified by the synchronization write pointer 162 in the synchronization completion table 12. The synchronization write pointer increments by one, indicating level 1.

Furthermore, "1" is set in level 0 of the synchronization flags for the valid entries in the individual scoreboards. In FIG. 24, the valid entries in memory areas 0, 1, and 2 are set at "1. " At the same time, "1" is set in level 0 in the synchronization completion table corresponding to memory areas 0, 1, and 2, meaning that the synchronization of level 0 has not been completed. Thereafter, since synchronization level 3 is being processed in FIG. 24, an operation is not issued until an operation for entry No. 0 in memory area 0 is issued. When entry No. 0 in memory area 0 has been issued, the synchronization of level 3 has been completed, so that level 3 in memory area 0 in the synchronization complete table 12 is reset to "0."Since the synchronization read pointer 161 increments by one, indicating level 0, operations whose synchronization flag of level 0 is set at "1" are issued in sequence, thereby allowing the synchronizing process of level 0 to be executed. When all of the synchronization flags of each level are at "0", the synchronizing operations of the level have been completed. Therefore, the synchronization completion table 12 may be omitted.

Next, the operation of the third embodiment will be explained in further detail.

First, the processing in the case where a memory access instruction has been issued by the CPU 1 in the third embodiment will be explained by reference to FIG. 25.

The memory access instruction issued by the CPU 1 is sent to the bus interface unit 3 via the bus 2. The bus interface unit 3 transfers the received memory access instruction to the memory controller 10 (step S51).

When the received memory access instruction is a memory access instruction other than a synchronizing instruction, the memory controller 10 selects the corresponding scoreboard from the scoreboards 100, 110, 120, 130 on the basis of the address of the received memory access instruction. Furthermore, the memory controller 10 selects an entry whose valid flag is set at "1" (an empty entry) from all of the entries on the selected scoreboard. Thereafter, the memory controller 10 enters the transferred memory access instruction in the selected entry (step S52).

When entering the memory access instruction, the memory controller 10 not only enters the operation code and address of the memory access instruction but also sets the valid flag to "V" for the entry in which the instruction is entered and resets the synchronization flags 0, 1, 2, and 3 to "0."

When receiving a synchronizing instruction from the bus interface unit 3, the memory controller 10 sets to "1" the synchronization flag n (n=0/1/2/3) corresponding to the SYNC write pointer for all of the entries whose valid flag entered in the selected scoreboard has been set to "V."

Furthermore, under the control of the bank execution units 108, 118, 128, 138, the memory controller 10 selects an entry from the scoreboard and issues the instruction in the entry.

When the entry (memory access instruction) entered at step S52 has been selected and the instruction in the entry has been issued (step S53, YES), the issuable flag for the selected entry is set to "NO" (step S54). The issued memory access instruction is executed by the bus interface unit 3, memory controller 10, and the bank execution units.

After the processing of the memory access instruction has been completed, the memory controller 10 sets to "1" the valid flag stored in the entry for the executed memory access instruction in the scoreboard and resets the synchronization flags 0, 1, 2, and 3 to "0" (step S55). By these processes, the entry in which the executed memory access instruction has been entered is set free.

Through the processing described above, the memory access instruction sent from the CPU 1 is executed.

Figure 26:
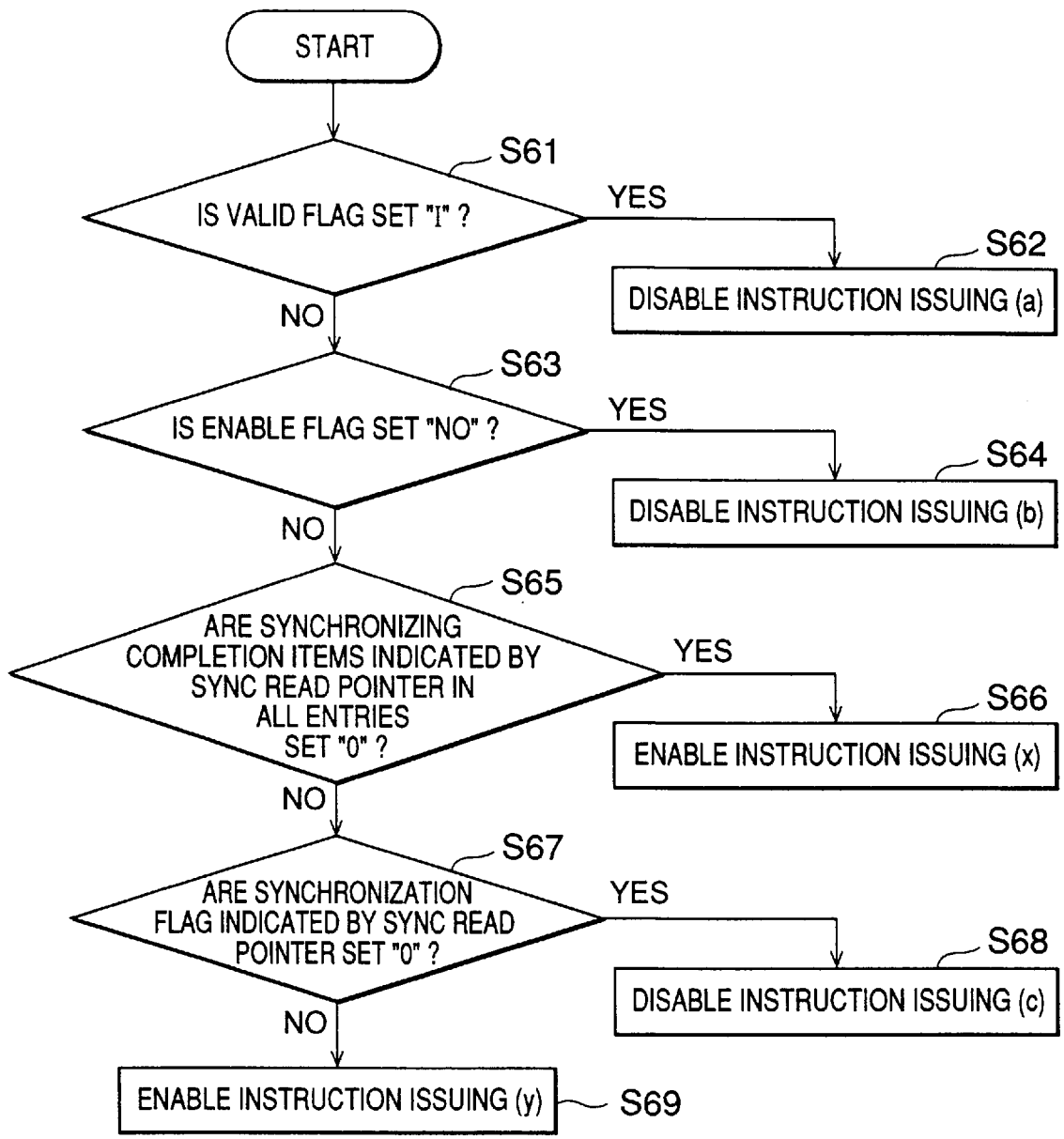
FIG. 26 is a flowchart for the determination process for the issuing of an instruction at the execution bank unit of the third embodiment.

Next, the process of issuing instructions at each of the bank execution units 108, 118, 128, and 138 provided so as to correspond to the scoreboards 100, 110, 120, and 130, respectively, will be described by reference to FIG. 26.

Regarding the entry in which the memory access instruction to be issued has been entered on the scoreboard, the bank execution unit first determines whether or not the valid flag for the relevant entry is at "I" (step S61). When the valid flag for the relevant entry is at "I," the bank execution unit determines that the memory access instruction in the relevant entry cannot be issued because the relevant entry is invalid (step S62).

When the valid flag for the relevant entry is at "V" (step S61, NO), the bank execution unit determines whether or not the issuing flag for the relevant entry is at "NO" (step S63). When the issuing flag for the relevant entry is at "NO," the bank execution unit determines that the instruction in the relevant entry has been issued already or is not satisfied with the conditions of issuing and does not issue the memory access instruction in the relevant entry (step S64).

When the issuing flag for the relevant entry is at "YES" (step S63, NO), the bank execution unit determines whether or not the item "SYNC COMPLETION" indicated by the SYNC read pointer has 0s for all of the areas in the synchronizing completion table 12 (step S65). Since the state where the item "SYNC COMPLETION" has 0s for all of the areas means that a synchronizing instruction has not been sent from the CPU 1, the bank execution unit determines that the memory access instruction in the relevant entry can be issued (step S66).

When the item "SYNC COMPLETION" has a 1 for any of the areas in the synchronizing completion table 12 (step S65, NO), the bank execution unit determines whether or not the synchronization flag indicated by the SYNC read pointer is at "0" among the synchronization flags 0 to 3 for the relevant entry (step S67). When the synchronization flag indicated by the SYNC read pointer is at "0," because the instruction in the relevant entry is a memory access instruction entered in the scoreboard after the memory controller 10 has received a synchronizing instruction, the bank execution unit does not issue the memory access instruction (step S68).

When the synchronization flag indicated by the SYNC read pointer is at "1" (step S68, NO), because the memory access instruction entered in the relevant entry is a memory access instruction entered before a synchronizing instruction has been sent, the bank execution unit determines that the memory access instruction in the relevant entry can be issued (step S69).

Explained next will be the processing of the memory controller 10 in the third embodiment at the time when the CPU 1 sends the following instructions in ascending order:

(1) Read 12380

(2) SYNC (3) Write 67830

(4) SYNC (5) Write abc80

FIGS. 27A to 33B show the data items entered in the scoreboard 100 provided for area 0 and the synchronizing completion table 12.

In FIGS. 27A to 33B, the item indicating "ISSUE ENABLE/DISABLE" of the instruction in each entry holds such information as represents the determination result of the bank execution units in FIG. 26 as follows: (a) corresponds to the determination result at step S62 of FIG. 26; (b) corresponds to the determination result at step S64; (x) corresponds to the determination result at step S66; (c) corresponds to the determination result at step S68; and (y) corresponds to the determination result at step S69. This makes it easier to understand the operation. Actually, however, the item has only to hold information just indicating "ISSUE ENABLE/DISABLE" of an instruction.

FIGS. 27A and 27B show the initial states of the scoreboard 100 and synchronizing completion table 12. Therefore, all of the entries in the scoreboard 100 are unused (empty). In all of the entries under the item "ISSUE ENABLE/DISABLE" on the scoreboard 100, data indicating ISSUE DISABLE has been entered. This corresponds to (a) which means that the entries are invalid when the bank execution unit 108 executes the processing of FIG. 18. Consequently, there is no entry that can be issued.

FIGS. 28A and 28B show the scoreboard 100 and synchronizing completion table 12 in the case where instruction (1) "Read 12380" has been transferred from the bus interface unit 3. Here, the memory controller 10 selects empty entry No. 0 from the scoreboard 100 for area 0 corresponding to the address of instruction "Read 12380" and enters the instruction in the entry. The entry No. 0 on the scoreboard 100 can be issued.

FIGS. 29A and 29B show the scoreboard 100 and synchronizing completion table 12 in the case where the memory controller 10 has received synchronizing instruction (2) "SYNC." The memory controller 10 sets the synchronization flag 0 in the valid entry ("V" under the item "Val") to "1" on the scoreboard 100. A "1" is set in the SYNC write pointer in the synchronizing completion table 12. A "1" is set in the SYNC completion flag 0 for area 0. The entry that the bank execution unit 108 can issue is entry No. 0.

FIGS. 30A and 30B show the scoreboard 100 and synchronizing completion table 12 in the case where the memory controller 10 has received instruction (3) "Write 67380" thereafter. The memory controller 10 selects empty entry No. 1 from the scoreboard 100 corresponding to the area 0 which is assigned predetermined addresses. The predetermined addresses include an address assigned by the instruction "Write 67380". After a while, the memory controller 10 enters the instruction in the selected entry. Entry No. 0 and entry No. 1 on the scoreboard 100 can be issued.

FIGS. 31A and 31B show the scoreboard 100 and synchronizing completion table 12 in the case where the memory controller 10 has received the second synchronizing instruction (4) "SYNC." The memory controller 10 sets the synchronization flag 1 corresponding to the SYNC write pointer in the synchronizing completion table 12 to "1" among the synchronization flags 0 to 3 for the valid entry ("V" under the item "Val") on the scoreboard 100. Thereafter,, a "2" is set in the SYNC write pointer in the synchronizing completion table 12. A "1" is set in the SYNC completion flag 1 for area 0. The entry that the bank execution unit 108 can issue is entry No. 0.

FIGS. 32A and 32B show the scoreboard 100 and synchronizing completion table 12 in the case where the memory controller 10 has received instruction (5) "Write abcd80" thereafter. The memory controller 10 selects empty entry No. 2 from the scoreboard 100 corresponding to the area 0 which is assigned predetermined addresses. The predetermined addresses include an address assigned by the instruction "Write abcd80". The memory controller 10 enters the instruction in the selected entry. Only entry No. 0 on the scoreboard 100 can be issued. This is because the entered instructions are issued in this order: (1), (3), and (5).

FIGS. 33A and 33B show the scoreboard 100 and synchronizing completion table 12 in the case where the bank execution unit 108 issues the instruction in entry No. 0. In the scoreboard 100, the item "Val" is set to "I," the item "En" is set to "NO," and both of SYNC flags 0 and 1 are reset to "0." This sets entry No. 0 free. Furthermore, in the synchronizing completion table 12, the SYNC read pointer is set to "1" and the SYNC completion flag 0 for area 0 is reset to "0."

The above-described processes enable the processing in the proper order in which instructions are issued, even when more than one synchronizing instruction has been sent.

(Fourth Embodiment)

Figure 34:
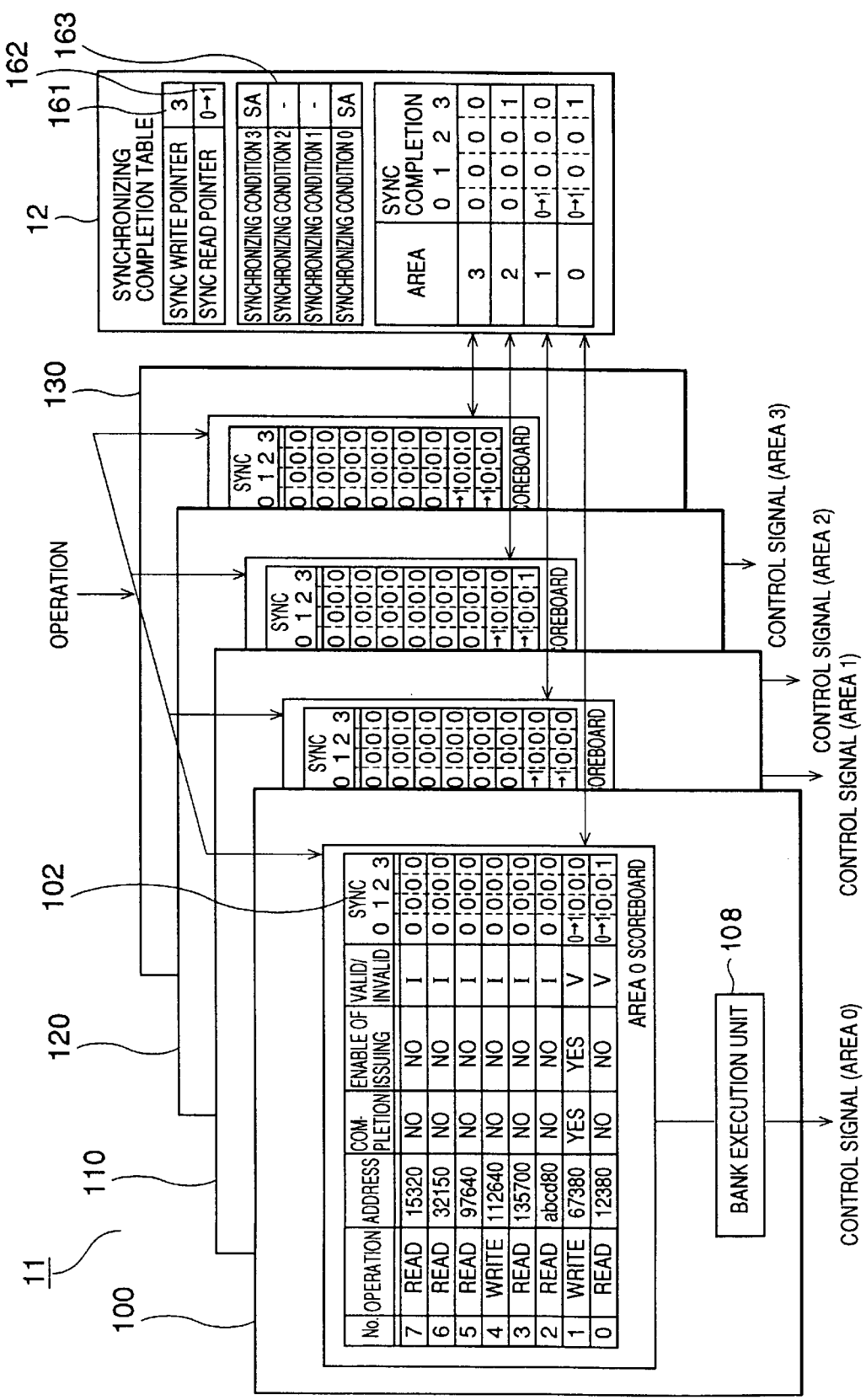
FIG. 34 is a conceptual diagram to help explain the structure of a scoreboard according to a fourth embodiment of the present invention.

As shown in FIG. 34, a fourth embodiment of the present invention is such that a synchronization completion table where independent synchronization conditions can be set for each level is provided in a memory controller 10 having scoreboards provided with synchronization flags (SYNC flags) of multiple levels and a synchronization completion table provided with synchronization completion flags (SYNC completion) of multiple levels. The fourth embodiment executes the completion of synchronizing processes in an out-of-order process, thereby achieving the function of reducing the overhead of the synchronizing process. Until all of the synchronization levels are used, a subsequent synchronizing operation is not retried.

In other words, the fourth embodiment is such that synchronization conditions of multiple levels are added to the third embodiment. With such a structure, in the case of different synchronization conditions, the same operation as in the second embodiment is executed and the preceding synchronizing operation is given "Null." In the case of the same synchronization conditions (e.g., synchronization by the same processor or synchronization with respect to the same address), a preceding synchronizing operation is set and the same operation as in the third embodiment is executed. Accordingly, in the case of independent synchronization conditions, synchronization is performed in an out-of-order manner, resulting in a decrease in the overhead of the synchronizing process.

Hereinafter, the fourth embodiment will be described briefly by reference to FIG. 34.

As shown in FIG. 34, the fourth embodiment has a synchronization completion table 12 provided with a synchronization condition table 163 indicating synchronization conditions (in this case, SA indicating that the same address) for each of synchronization levels 0 to 3. This enables independent synchronizing operations to be executed independently.

With the fourth embodiment, when the synchronization condition is that read and write to the same address, the synchronization condition has nothing to do with the other memory areas. For instance, in the case of the reading and writing of the data from and into an address (e.g., address 100) in memory area 0, a synchronizing operation has been issued, memory areas 1, 2, and 3 can be operated under the same conditions as when there is no synchronizing operation. In this case, when a synchronizing operation with respect to an address (e.g., address 1008) in memory area 2 has been issued, it can be processed independently of the synchronizing operation previously issued to memory area 0.

The operations other than applying the synchronization condition to the individual levels are the same as those in the third embodiment. In the state of FIG. 34, SA indicating that "the same address" is used as the synchronization condition is set for the synchronization conditions 0 and 3. Since memory area 3 does not satisfy the synchronization condition, an operation arrived thereafter can be executed without waiting for the completion of the synchronization of another memory area. If synchronization condition 3 is "for all of the addresses", an entry in memory area 3 can be issued at the time when synchronization condition 3 has been completed. When all of the synchronization levels for each level are at "0," the synchronization of that level has been completed. Therefore, the synchronization completion table may be omitted.

As described above, when the fourth embodiment is applied to a memory controller having a memory bank structure, the synchronizing process can be performed independently on a bank basis in a case where the synchronization conditions differ from bank to bank.

Next, the operation of the fourth embodiment will be explained in further detail.

Figure 25:
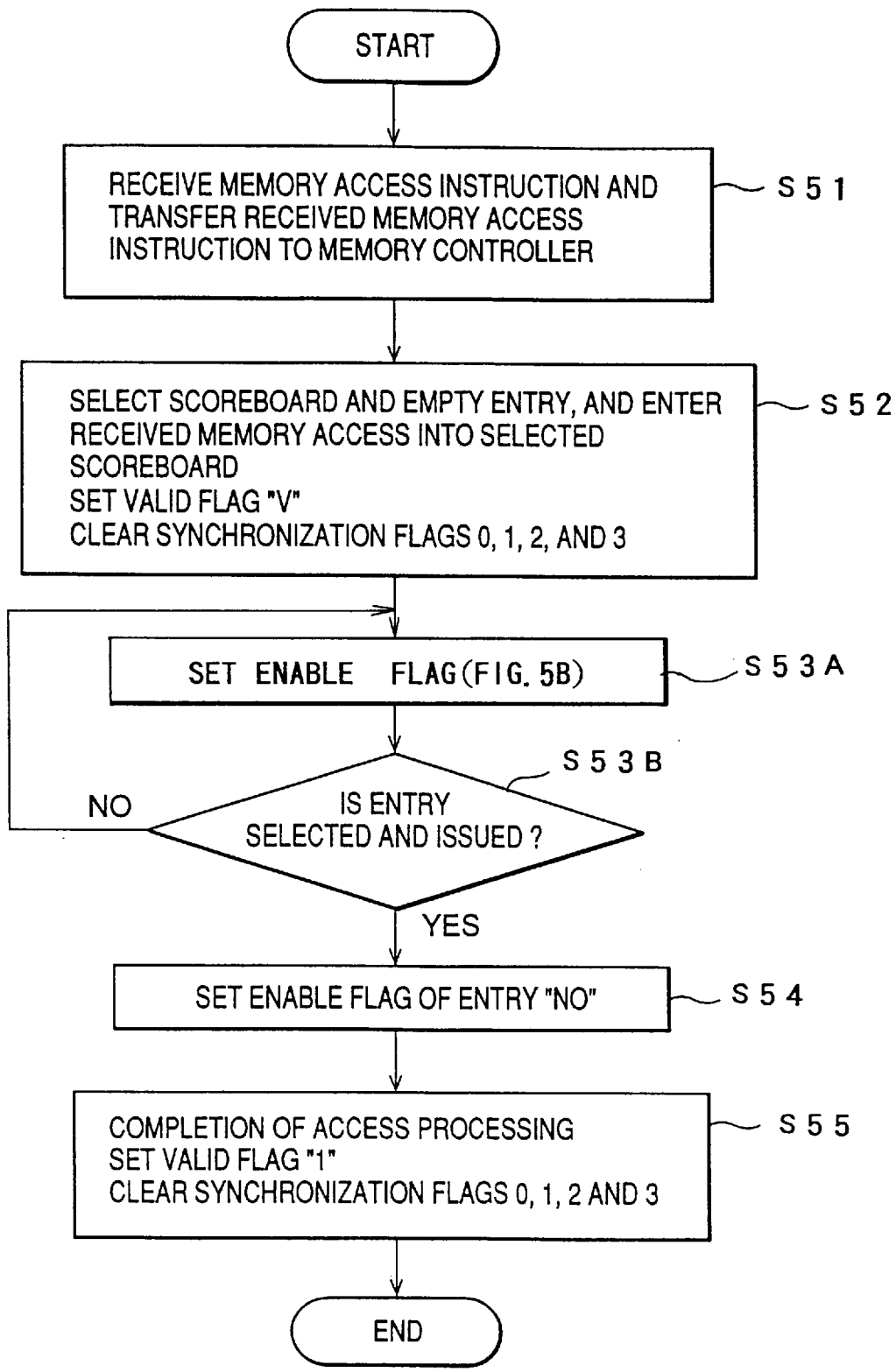
FIG. 25 is a flowchart for the operation of the memory controller at the time when it has received memory access instruction in the third embodiment.

The processing in the case where a memory access instruction has been issued by the CPU 1 in the fourth embodiment is similar to the processing in the third embodiment of FIG. 25, so a detailed explanation of the fourth embodiment will be omitted.

Figure 35:
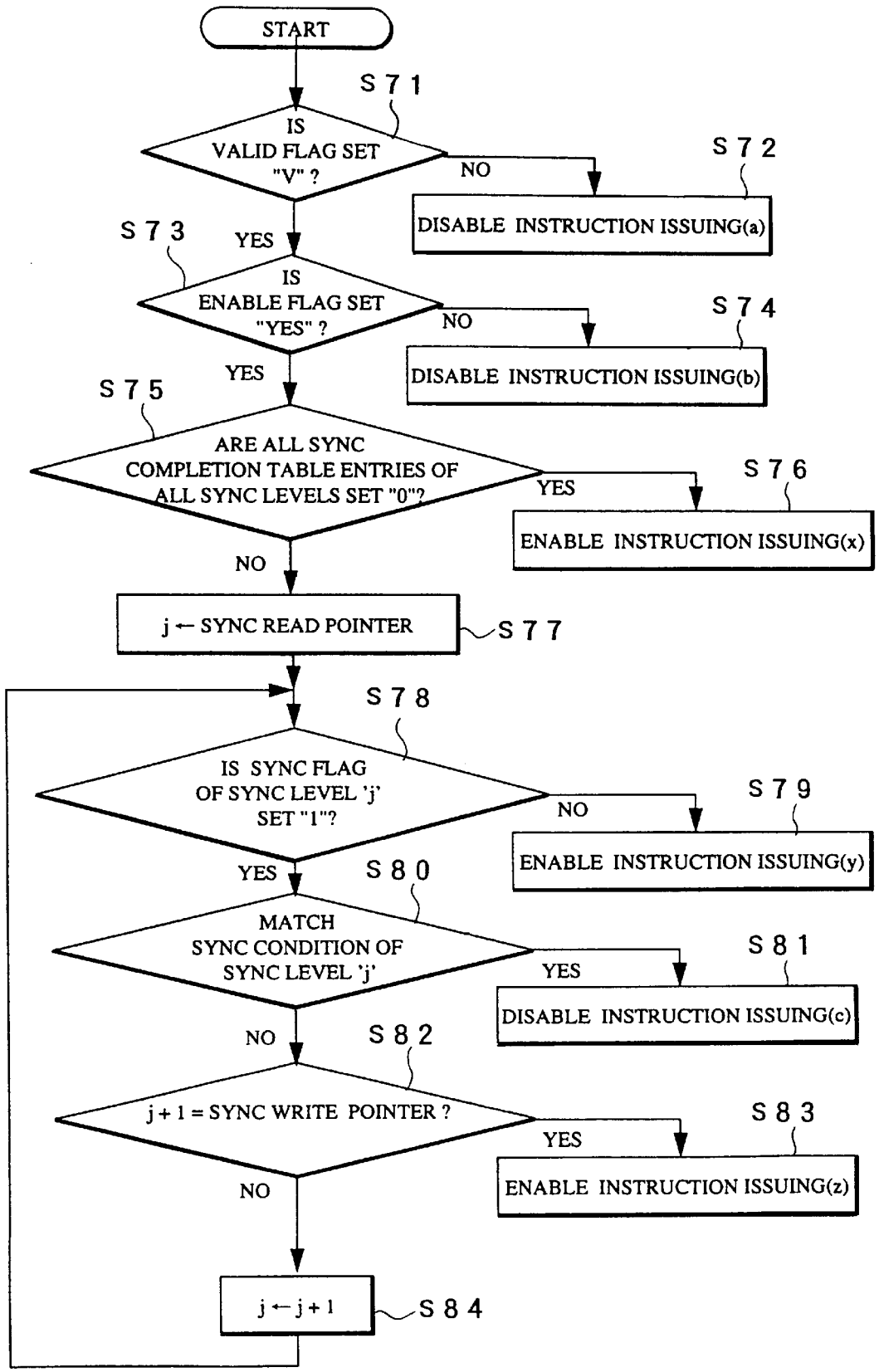
FIG. 35 is a flowchart for the determination process for the issuing of an instruction at the execution bank of the fourth embodiment.

Next, the process of issuing instructions at each of the bank execution units 108, 118, 128, and 138 provided so as to correspond to the scoreboards 100, 110, 120, and 130, respectively, will be described by reference to FIG. 35.

Regarding the entry in which the memory access instruction to be issued has been entered on the scoreboard, the bank execution unit first determines whether or not the valid flag for the relevant entry is set "V" (step S71). When the valid flag for the relevant entry is set "I", the bank execution unit determines that the memory access instruction in the relevant entry cannot be issued because the relevant entry is invalid (step S72).

When the valid flag for the relevant entry is at "V" (step S71, YES), the bank execution unit determines whether or not the enable flag for the relevant entry is set "YES" (step S73).

When the enable flag for the relevant entry is set "NO" (step S73, NO), the bank execution unit determines that the memory access instruction in the relevant entry is not satisfied with the conditions of issuing or has been issued already. As the former state, there are cases where, when the memory write instruction is executed, write data has not been transferred to the memory controller or a snooper does not determine a response to the memory write request. As the latter state, there are cases where, when the memory read instruction is executed, the read request has been transferred to the DRAM but the requested read data has not reached at the memory controller. As a result, the bank execution unit does not issue the memory access instruction in the relevant entry (step S74).

When the enable flag for the relevant entry is set "YES" (step S73, YES), the bank execution unit determines whether or not all "SYNC COMPLETION ENTRIES" of all synchronizing levels are set "0" in the synchronizing completion table 12 (step S75). Since the state where all "SYNC COMPLETION ENTRIES" are set "0" means that the synchronizing operation is finished which relate to the area corresponding to the bank execution unit, the bank execution unit determines that the memory access instruction in the relevant entry can be issued (step S76).

When one or more "SYNC COMPLETION ENTRY" are set "1" on all synchronizing levels in the synchronizing completion table 12 (step S75, NO), the determination of that the memory access instruction can be issued or not is executed based on the following steps S77 to S84. A loop as shown in FIG. 35, by steps S78, S80, S82 and S84 is processing for determining of that the memory access instruction can be issued or not in order of the synchronizing. In fact, the above steps are executed in parallel on the implement hardware of the fourth embodiment. That is, the implement hardware does not necessitate the pointer (pointer "j") for work. The pointer "j" is shown in FIG. 35 merely for convenience of flowchart description and the pointer "j" is not shown in FIG. 34.

The bank execution unit read the first issued synchronizing condition to determine the order of the synchronizing conditions which have not been executed yet (step S77). A first synchronizing condition of the not-yet-executed synchronizing conditions is indicated by the SYNC read pointer 162. In the step S77 of the FIG. 35, the value indicated by the SYNC read pointer 162 is set in the pointer "j" for work.

After the last issued synchronizing condition is read, the bank execution unit determines that the SYNC flags on the synchronizing level "j" of the entries in the scoreboard are set "1" respectively (step S78). When the SYNC flag of the relevant entry is set "1" (step S78, YES), the memory access instruction of the relevant entry can be executed because the memory access instruction is issued before the synchronizing instruction of the synchronizing level "j" (step S79).

When the SYNC flag of the relevant entry is not set "1" (step S78, NO), the bank execution unit determines that whether or not the relevant entry is a synchronizing target instruction on the synchronizing level "j" (step S80). That is, it is determined that whether or not the relevant entry matches the SYNC condition of the SYNC level "j". When the relevant entry is a synchronizing instruction (step 80, YES), the memory access instruction of the relevant entry can not executed (step S81).

When the relevant entry is not a synchronizing instruction (step S80, NO), the bank execution unit determines that whether or not a synchronizing level which is to be executed following the synchronizing level "j" coincides with the synchronizing level indicated by the SYNC write pointer 162. The state where the synchronizing level following the synchronizing level "j" coincides with the synchronizing level indicated by the SYNC write pointer 162, means that the synchronizing level following the synchronizing level "j" is a last synchronizing level. Since the relevant entry is not satisfied with the last synchronizing condition, the memory access instruction of the relevant entry can be executed (step 83).

When the synchronizing level which is to be executed following the synchronizing level "j" does not coincide with the synchronizing level indicated by the SYNC write pointer 162, a subsequent synchronizing level is studied since the synchronizing level following the synchronizing level "j" is not a last synchronizing level. In FIG. 35, the work pointer "j" is incremented (step S84). Step S84 may be made that the memory access instruction of the relevant entry can not executed in order to omit the loop processing of the steps S78, S80, S82 and S84.

In the fourth embodiment, a dependency table which corresponds to varieties of the synchronizing levels may be made for each entries in the scoreboard. The dependency table indicates such as address coincidence and same processor use (coincidence of processor ID). In this case, when a transferred instruction is entered in the scoreboard, the bank execution unit compares an address and a processor ID with the both of other entries of the scoreboard. A valid flag is set in the table on the relevant entry when a coincidence occurs. The valid flag is cleared otherwise. In this modification, assuming that N1 indicates the numbers of entries of the scoreboard, the numbers of comparators is the order of N1.

In the modification, the processing relating to the synchronizing on the determination of the memory access issuing will be described below. First, the row values of the dependency table are NORed (#1). The values of the each areas on the SYNC completion table are ORed on the synchronizing conditions respectively (#2). The logical NOR in #1 and the logical OR in #2 are ANDed (#3). On the all synchronizing conditions, all of the logical AND in #3 are ORed (#4).

The values stored in the SYNC completion table are ORed (#5). When the logical OR in #5 is "0", since the synchronizing has not been executed, the condition for execution is the logical AND between the "Val" flag and the "En" flag. When the logical OR in #5 is "1," since the synchronizing has been executed, the condition for execution is the logical AND between the logical AND between "Val" and "En", and the logical OR in #4.

Finally, the logical OR in #4, the "En" flag and the "Val" flag are ANDed (#6). It is issuable entry whose result of the logical AND operation in #6 is "1".

Explained next will be the processing of the memory controller 10 in the fourth embodiment at the time when the CPU 1 sends the following instructions in ascending order:

(1) Read 12380
(2) SYNC
(3) Write 67830
(4) Write 12380

(5) SYNC (6) Write abcd80

FIGS. 36A to 42B show the data items entered in the scoreboard 100 provided for area 0 and the synchronizing completion table 12.

It is assumed that the synchronizing condition is the same as that in the second embodiment.

In FIGS. 36A to 42B, the item indicating "ISSUE ENABLE/DISABLE" of the instruction in each entry holds such information as represents the determination result of the bank execution units in FIG. 35 as follows: (a) corresponds to the determination result at step S72 of FIG. 35; (b) corresponds to the determination result at step S73; (x) corresponds to the determination result at step S75; (y) corresponds to the determination result at step S78; (c) corresponds to the determination result at step S80; and (z) corresponds to the determination result at step S82. This makes it easier to understand the operation. Actually, however, the item has only to hold information just indicating "ISSUE ENABLE/DISABLE" of an instruction.

Figures 36A, 36B:
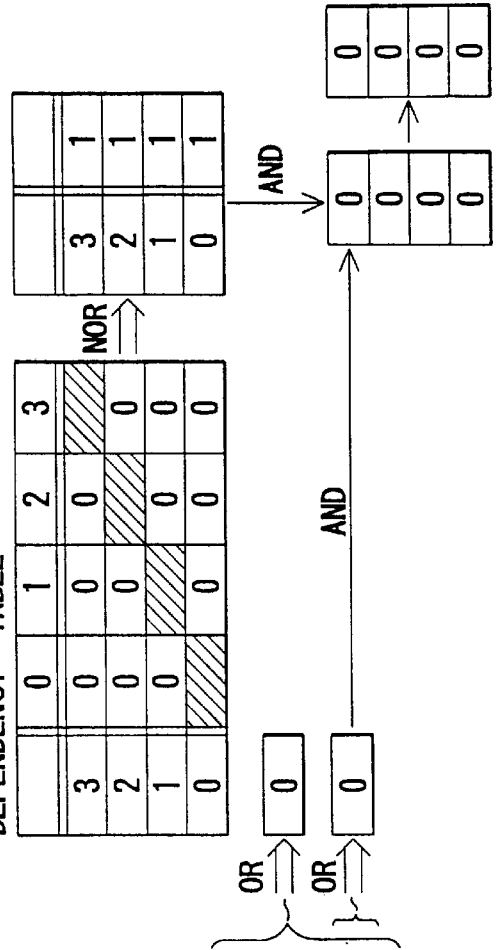
FIGS. 36A and 36B show examples of the scoreboard and the synchronizing completion table in the fourth embodiment.

FIGS. 36A and 36B show the initial states of the scoreboard 100 and synchronizing completion table 12. Therefore, all of the entries in the scoreboard 100 are unused (empty). In all of the entries under the item "ISSUE ENABLE/DISABLE" on the scoreboard 100, data indicating ISSUE DISABLE has been entered. This corresponds to (a) which means that the entries are invalid when the bank execution unit 108 executes the processing of FIG. 35. Consequently, there is no entry that can be issued.

Figures 37A, 37B:
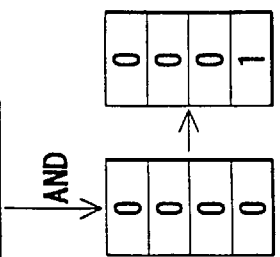
FIGS. 37A and 37B show examples of the scoreboard and the synchronizing completion table in the fourth embodiment.

FIGS. 37A and 37B show the scoreboard 100 and synchronizing completion table 12 in the case where instruction (1) "Read 12380" has been transferred from the bus interface unit 3. Here, the memory controller 10 selects empty entry No. 0 from the scoreboard 100 for area 0 corresponding to the address of instruction "Read 12380" and enters the instruction in the entry. The entry No. 0 on the scoreboard 100 can be issued.

Figures 38A, 38B:
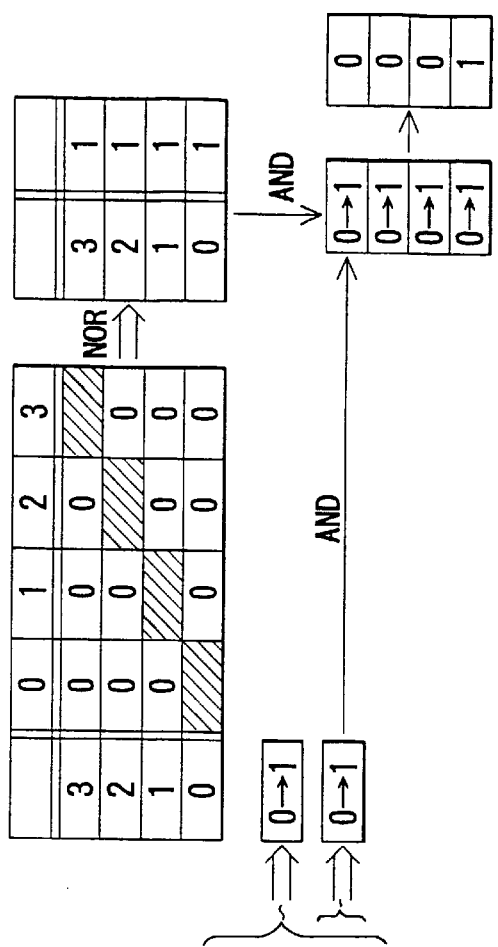
FIGS. 38A and 38B show examples of the scoreboard and the synchronizing completion table in the fourth embodiment.

FIGS. 38A and 38B show the scoreboard 100 and synchronizing completion table 12 in the case where the memory controller 10 has received synchronizing instruction (2) "SYNC." The memory controller 10 sets the synchronization flag 0 in the valid entry ("V" under the item "Val") to "1" on the scoreboard 100. A "1" is set in the SYNC write pointer in the synchronizing completion table 12. The SYNC completion flag 0 corresponding to area 0 is set to "1." The entry that the bank execution unit 108 can issue is entry No. 0.

Figures 39A, 39B:
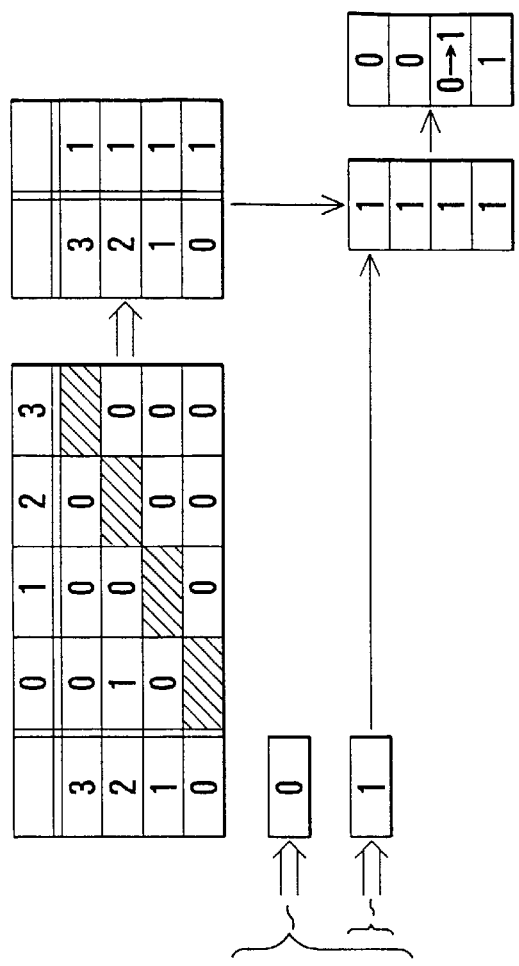
FIGS. 39A and 39B show examples of the scoreboard and the synchronizing completion table in the fourth embodiment.

FIGS. 39A and 39B show the scoreboard 100 and synchronizing completion table 12 in the case where the memory controller 10 has received instruction (3) "Write 67380" thereafter. The memory controller 10 selects empty entry No. 1 from the scoreboard 100 for area 0 corresponding to the address of instruction "Write 67380" and enters the instruction in the entry. Entry No. 0 and entry No. 1 on the scoreboard 100 can be issued.

Figures 40A, 40B:
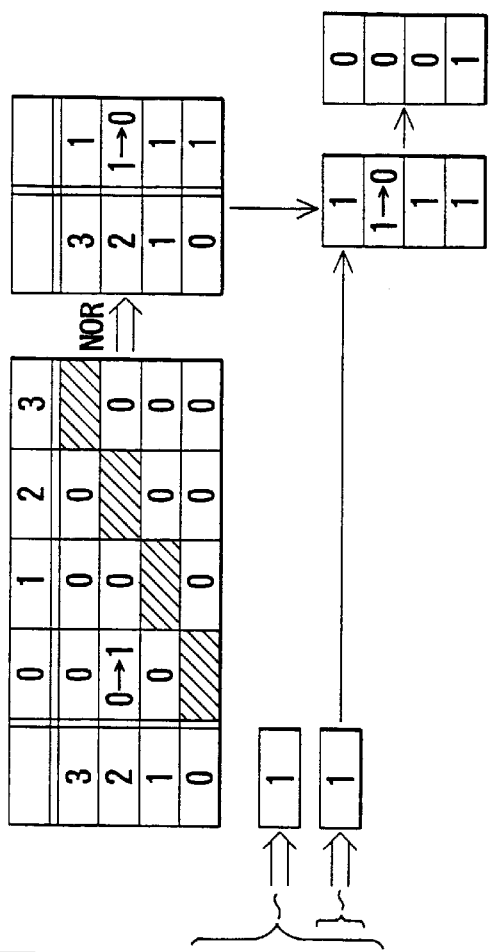
FIGS. 40A and 40B show examples of the scoreboard and the synchronizing completion table in the fourth embodiment.

FIGS. 40A and 40B show the scoreboard 100 and synchronizing completion table 12 in the case where the memory controller 10 has received instruction (4) "Write 12380" thereafter. The memory controller 10 selects empty entry No. 2 from the scoreboard 100 for area 0 corresponding to the address of instruction "Write 12380" and enters the instruction in the entry. Only entry No. 0 and entry No. 1 on the scoreboard 100 can be issued.

Figures 41A, 41B:
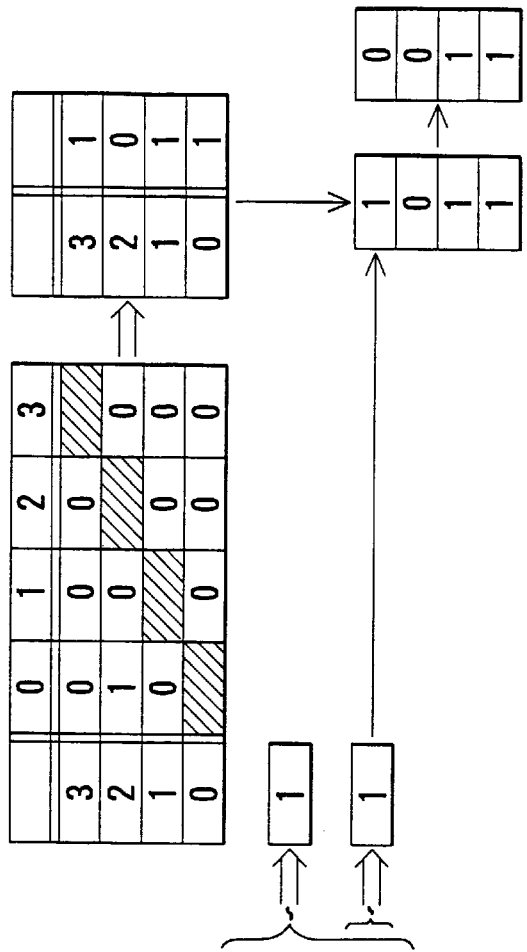
FIGS. 41A and 41B show examples of the scoreboard and the synchronizing completion table in the fourth embodiment.

FIGS. 41A and 41B show the scoreboard 100 and synchronizing completion table 12 in the case where the memory controller 10 has received the second synchronizing instruction (5) "SYNC." The memory controller 10 sets the synchronization flag 1 corresponding to the SYNC write pointer in the synchronizing completion table 12 to "1" among the synchronization flags 0 to 3 for the valid entry ("V" under the item "Val") on the scoreboard 100. Thereafter, a "2" is set in the SYNC write pointer in the synchronizing completion table 12. The SYNC completion flag 1 for area 0 is set to "1." The entries that the bank execution unit 108 can issue are only entry No. 0 and entry No. 1.

Figures 42A, 42B:
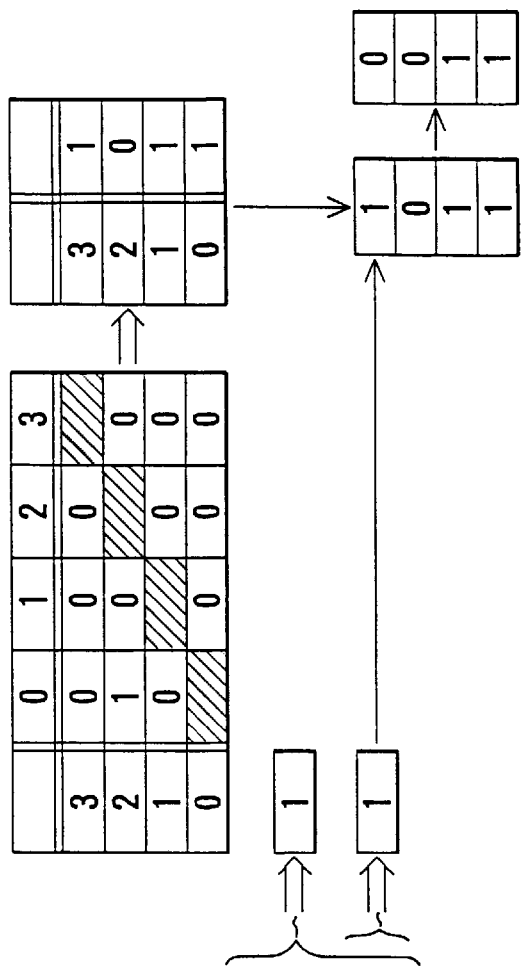
FIGS. 42A and 42B show examples of the scoreboard and the synchronizing completion table in the fourth embodiment.

FIGS. 42A and 42B show the scoreboard 100 and synchronizing completion table 12 in the case where the memory controller 10 has received instruction (6) "Write abcd80" thereafter. The memory controller 10 selects empty entry No. 3 from the scoreboard 100 for area 0 corresponding to the address of instruction "Write abcd80" and enters the instruction in the entry. Here, a "2" is set in the SYNC write pointer in the synchronizing completion table 12. The SYNC completion flag 1 for area 0 is set to "1." The entries that the bank execution unit 108 can issue are only entry No. 0 and entry No. 1.

The above-described processes enable the memory controller 10 not only to accept a plurality of instruction but also to issue a memory access instruction according to the predetermined synchronizing condition.

(Fifth Embodiment)

A fifth embodiment of the present invention is such that in the memory controller 10 of the first embodiment, the synchronization completion table is omitted and the synchronization flags are removed from the scoreboards 11.

Specifically, with the fifth embodiment, the synchronization conditions are applied to all of the operations (regardless of synchronization). When operations having the condition for a synchronizing operation are executed (for the same request or the same address), only the operations meeting the synchronization conditions are always executed, regardless of the execution of synchronization. This not only enables the synchronization flags and synchronization completion flags to be omitted but also prevents an operation after the synchronization instruction from being retried, thereby improving the processing capability of the system. The fifth embodiment is particularly effective when condition determination is made in a weak order manner rather than an out-of-order manner. That is, since in an ordinary system, it is sufficient to assure the order in which the same address is accessed, the fifth embodiment is effective. In order to implement the fifth embodiment, the order in which the same address (part of the address may be compared) is accessed is not changed, or means for preventing the order of write and write and the order of read and write (order flags explained later) from being changed is needed.

Hereinafter, the fifth embodiment will be explained briefly by reference to FIG. 43.

Figure 43:
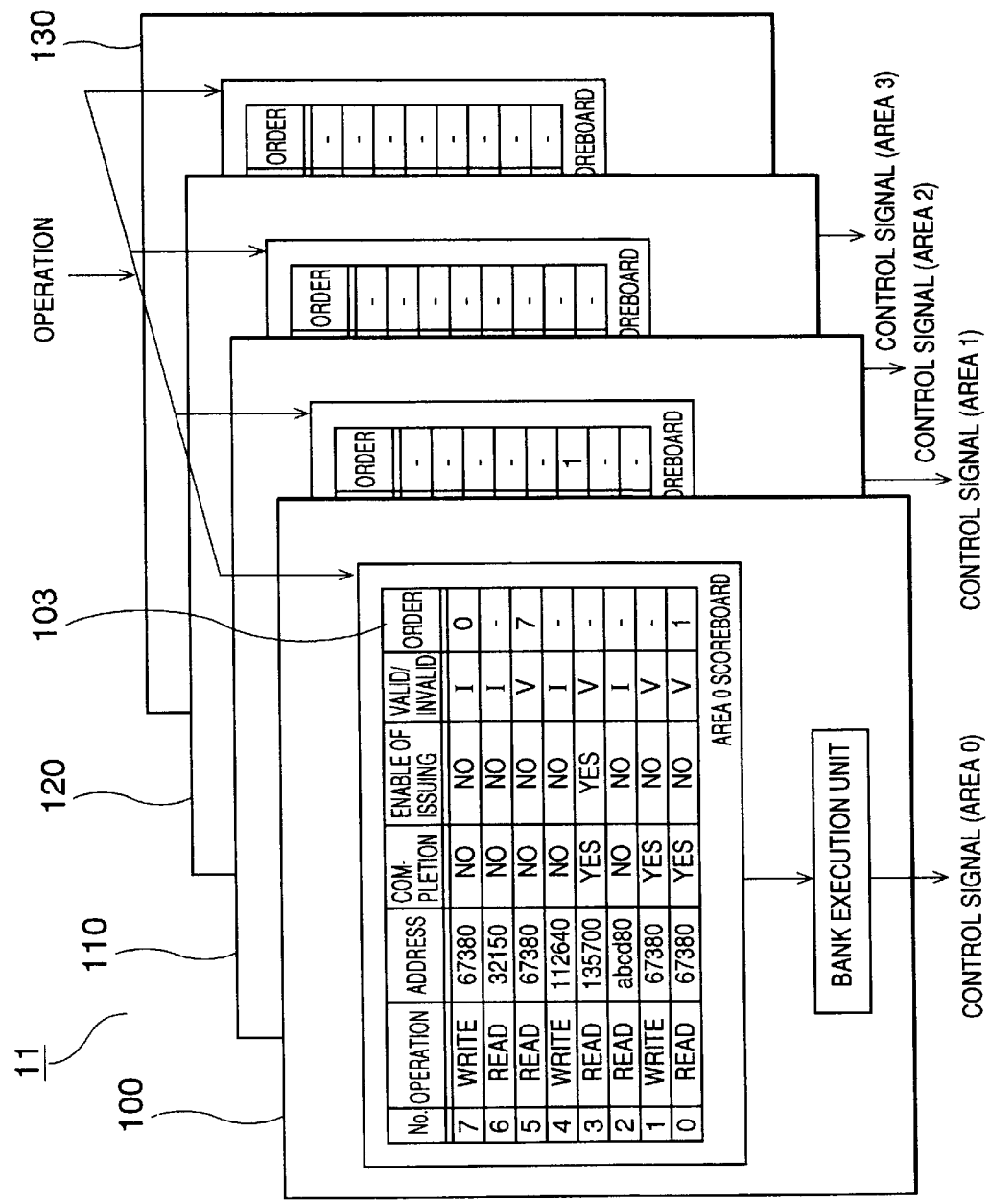
FIG. 43 is a conceptual diagram to help explain the structure of a scoreboard according to a fifth embodiment of the present invention.

As shown in FIG. 43, with the fifth embodiment, the synchronization conditions are applied to all of the operations. The synchronization flags and synchronization completion table are eliminated. Entries for order flags 103 indicating preceding operations are added to the scoreboards 100, 110, 120, and 130.

When a preceding operation has the same address, for example, the entry number of the preceding operation is set in the entry. When the preceding operation has been issued or invalidated, the order flag is invalidated (–) to enable an operation to be issued.

For instance, in a case where all of the synchronizing operations are for "the reading and writing of the data from and into the same address", when access to the same address has entered already at the time that an operation is written into the entry, the entry number is set as an order flag. When more than one access to the same address has been entered, the entry number of the access entered last is set as an order flag.

As long as the preceding operation, or the order flag, is valid, the relevant entry operation cannot be issued. When the preceding operation has been processed, the order flag for the subsequent entry is cleared and the subsequent entry can be issued. If an entry is canceled after having been entered for some reason, leaving the entry as NOP prevents the memory device from being locked by cancellation.

FIG. 43 shows a case where a synchronizing process is always executed with respect to the same address. For instance, in memory area 0, four of the valid entries have access to the same address. With the fifth embodiment, a preceding operation on the same address is specified by an order flag, provided that synchronization is always executed with respect to the same address.

In the state of FIG. 43, the entries No. 1, No. 0, No. 7, and No. 5 access the same address in sequence. Although entry No. 0 has been completed as a bus operation, entry No. 1 has been entered in an order flag as a preceding operation, so that entry No. 0 cannot be issued until the processing of entry No. 1 has been completed. Similarly, entry No. 7 cannot be issued until the processing of entry No. 0 has been completed. Entry No. 5 cannot be issued until the processing of entry No. 7 has been completed. This assures that the entries are executed in this order: entry No. 1, entry No. 0, entry No. 7, and entry No. 5.

Since the bus operation has not been completed, entry No. 7 may be canceled. If entry No. 7 has been canceled, then the operation is changed from "Write" to "Nop" instead of the valid flag in the entry being changed to "I", which prevents cancellation from disabling entry No. 5 from being issued forever.

Next, the operation of the fifth embodiment will be explained in further detail.

Figure 44:
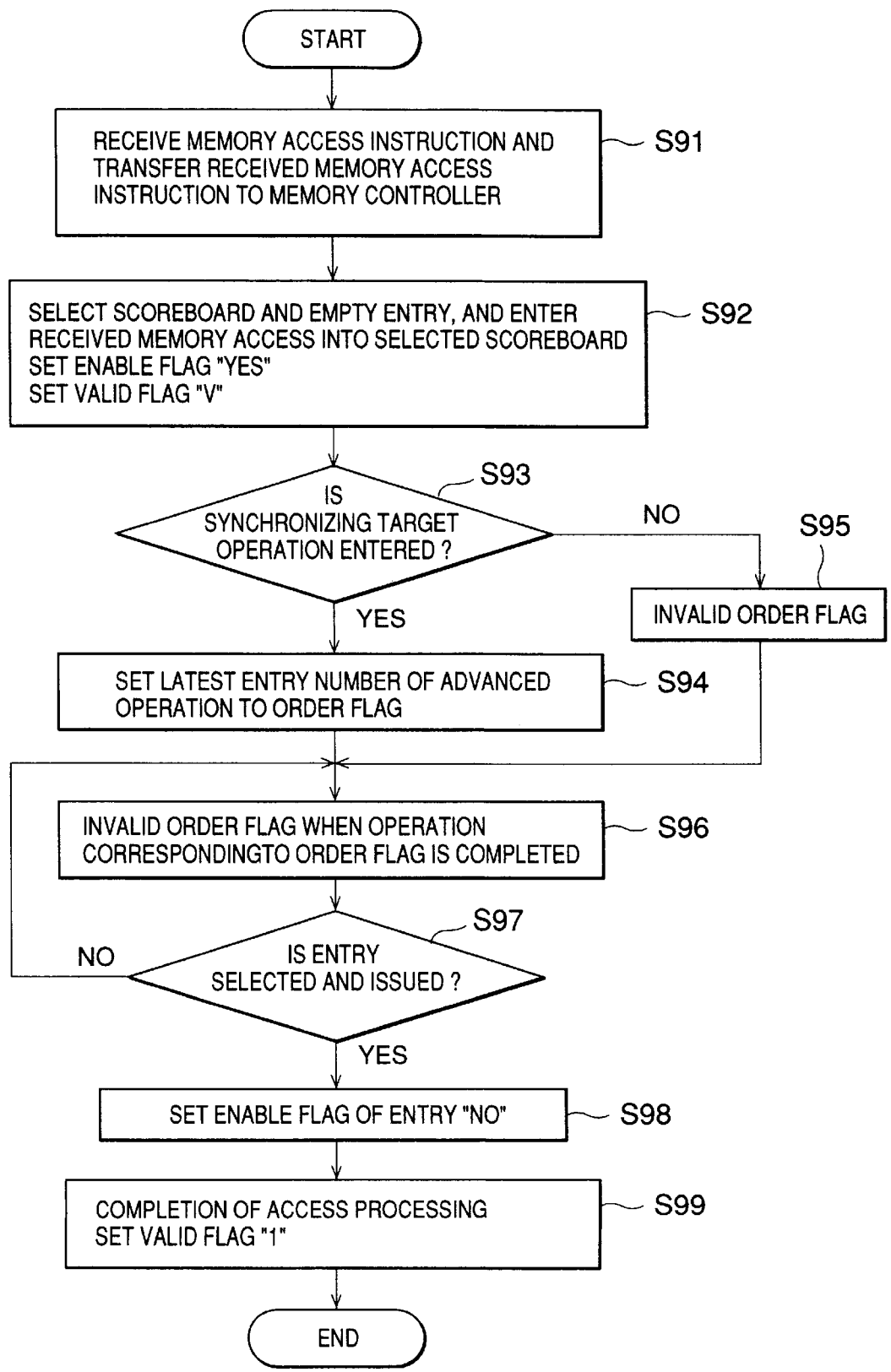
FIG. 44 is a flowchart for the operation of the memory controller at the time when it has received a memory access instruction in the fifth embodiment.

First, the processing in the case where a memory access instruction has been issued by the CPU 1 in the fifth embodiment will be explained by reference to FIG. 44.

The memory access instruction issued by the CPU 1 is sent to the bus interface unit 3 via the bus 2. The bus interface unit 3 transfers the received memory access instruction to the memory controller 10 (step S91).

When the received memory access instruction is a memory access instruction other than a synchronizing instruction, the memory controller 10 selects the corresponding scoreboard from the scoreboards 100, 110, 120, 130 on the basis of the address of the received memory access instruction. Furthermore, the memory controller 10 selects an entry whose valid flag is set at "I" (an empty entry) from all of the entries on the selected scoreboard. Thereafter, the memory controller 10 enters the transferred memory access instruction in the selected entry (step S92).

When entering the memory access instruction, the memory controller 10 not only enters the operation code and address of the memory access instruction but also sets the valid flag to "V."

According to the synchronizing condition, the memory controller 10 determines whether or not an operation related to the memory access instruction in the relevant entry, or an operation to be synchronized, exists on the scoreboard (step S93). If an operation to be synchronized exists, the memory controller 10 will enter the entry number of the (preceding) last entered operation to be synchronized in the order flag (step S94). If an operation to be synchronized does not exist, the memory controller 10 invalidates the order flag for the relevant entry (step S95).

When the (preceding) operation indicated by the entry number entered in the order flag of the entry has been completed, the order flag is invalidated (step S96).

Furthermore, under the control of the bank execution units 108, 118, 128, 138, the memory controller 10 selects an entry from the scoreboard and issues the instruction in the entry (step S97).

When the entered entry (memory access instruction) has been selected and the instruction in the entry has been issued (step S97, YES), the issuable flag for the selected entry is set to "NO" (step S98). The issued memory access instruction is executed by the bus interface unit 3, memory controller 10, and the bank execution units.

After the processing of the memory access instruction has been completed, the memory controller 10 not only sets the valid flag stored in the entry for the executed memory access instruction in the scoreboard to "I" but also sets free the entry in which the executed memory instruction has been entered (step S99). If the entry order flag indicating the processed entry exists, the memory controller 10 will invalidate the order flag.

Through the processing described above, the memory access instruction sent from the CPU 1 is executed.

Figure 45:
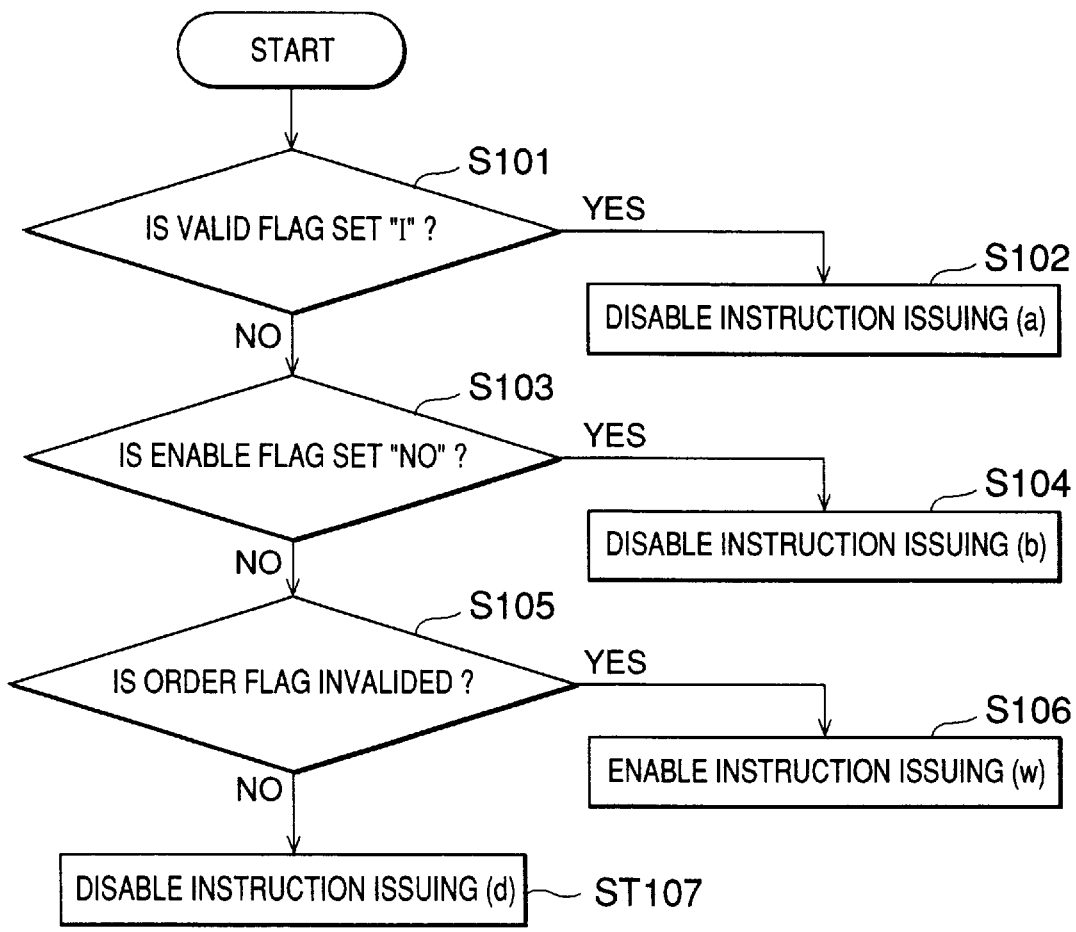
FIG. 45 is a flowchart for the determination process for the issuing of an instruction at the execution bank units of the fifth embodiment.

Next, the process of issuing instructions at each of the bank execution units 108, 118, 128, and 138 provided so as to correspond to the scoreboards 100, 110, 120, and 130, respectively, will be described by reference to FIG. 45.

Regarding the entry in which the memory access instruction to be issued has been entered on the scoreboard, the bank execution unit first determines whether or not the valid flag for the relevant entry is at "I" (step S101). When the valid flag for the relevant entry is at "I," the bank execution unit determines that the memory access instruction in the relevant entry cannot be issued because the relevant entry is invalid (step S102).

When the valid flag for the relevant entry is at "V" (step S101, NO), the bank execution unit determines whether or not the issuing flag for the relevant entry is at "NO" (step S103). When the issuing flag for the relevant entry is at "NO," the bank execution unit determines that the instruction in the relevant entry has been issued already or is not satisfied with the conditions of issuing and does not issue the memory access instruction in the relevant entry (step S104).

When the issuing flag for the relevant entry is at "YES" (step S103, NO), the bank execution unit determines whether or not the order flag is invalid (step S105). When the order flag is invalid, this means that the synchronizing process is not needed, or that the preceding process of the relevant entry has been completed, so the bank execution unit determines that the memory access instruction in the relevant entry can be issued (step S106).

When the order flag is not invalid (step S105, NO), this means that the synchronizing process is in progress, or that the preceding process of the relevant entry is being waited for, so the bank execution unit determines that the memory access instruction in the relevant entry cannot be issued (step S107).

Explained next will be the processing of the memory controller 10 in the fifth embodiment at the time when the CPU 1 sends the following instructions in ascending order:

(1) Read 12380
(2) Write 67830
(3) Write 12380
(4) Read 12380
(5) Read abcd70

FIGS. 46 to 53 show the data items entered in the scoreboard 100 provided for area 0 and the synchronizing completion table 12.

It is assumed that the synchronizing condition is that "a read/write instruction with respect to the same address can be issued after the preceding process has been completed." This is the condition that when the preceding memory access instruction with respect to the same address exists, a read/write instruction with respect to the same address always cannot be issued, regardless of the synchronizing instruction, whereas when the preceding memory access instruction does not exist, the read/write instruction can be issued.

In FIGS. 46 to 53, the item indicating "ISSUE ENABLE/DISABLE" of the instruction in each entry holds such information as represents the determination result of the bank execution units in FIG. 45 as follows: (a) corresponds to the determination result at step S102 of FIG. 45; (b) corresponds to the determination result at step S104; (w) corresponds to the determination result at step S106; and (d) corresponds to the determination result at step S107. This makes it easier to understand the operation. Actually, however, the item has only to hold information just indicating "ISSUE ENABLE/DISABLE" of an instruction.

FIG. 46 shows the initial state of the scoreboard 100. Therefore, all of the entries in the scoreboard 100 are unused (empty). In all of the entries under the item "ISSUE ENABLE/DISABLE" on the scoreboard 100, data indicating ISSUE DISABLE has been entered. This corresponds to (a) which means that the entries are invalid when the bank execution unit 108 executes the processing of FIG. 45. Consequently, there is no entry that can be issued.

FIG. 47 shows the scoreboard 100 in the case where instruction (1) "Read 12380" has been transferred from the bus interface unit 3. Here, the memory controller 10 selects empty entry No. 0 from the scoreboard 100 for area 0 corresponding to the address of instruction "Read 12380" and enters the instruction in the entry. The entry No. 0 on the scoreboard 100 can be issued.

FIG. 48 shows the scoreboard 100 in the case where the memory controller 10 has received instruction (2) "Write 67380" thereafter. The memory controller 10 selects empty entry No. 1 from the scoreboard 100 for area 0 corresponding to the address of instruction "Write 67380" and enters the instruction in the entry. Entry No. 0 and entry No. 1 on the scoreboard 100 can be issued.

FIG. 49 shows the scoreboard 100 in the case where the memory controller 10 has received instruction (3) "Write 12380" thereafter. The memory controller 10 selects empty entry No. 2 from the scoreboard 100 for area 0 corresponding to the address of instruction "Write 12380" and enters the instruction in the entry. Because the address 12380 is the same as the address for the memory access instruction in entry No. 0, the flag (data) indicting entry No. 0 is set as the order flag for entry No. 2. Only entry No. 0 and entry No. 1 on the scoreboard 100 can be issued according to the synchronizing condition.

FIG. 50 shows the scoreboard 100 in the case where the memory controller 10 has received instruction (4) "Read 12380." The memory controller 10 selects empty entry No. 3 from the scoreboard 100 for area 0 corresponding to the address of instruction "Read 12380" and enters the instruction in the entry. Because the address 12380 is the same as the address for the memory access instruction in entry No. 0 and entry No. 2, the flag (data) indicting the latest entered entry No. 2 is set as the order flag for entry No. 3. According to the synchronizing condition, only the entry No. 0 and entry No. 1 on the scoreboard 100 can be issued.

FIG. 51 shows the scoreboard 100 in the case where the bank execution unit 108 selects entry No. 0 on the scoreboard 100 and instruction (1) "Read 12380" is issued. The memory controller 10 sets entry No. 0 under the item "En" to "NO" on the scoreboard 100 and sets entry No. 0 free. Only entry No. 1 on the scoreboard 100 can be issued.

FIG. 52 shows the scoreboard 100 at the time when the processing of the issued instruction (1) "Read 12380" has been completed. The memory controller 10 invalidates the order flag for entry No. 2 on the scoreboard 100. Therefore, Only entry No. 1 and entry No. 2 on the scoreboard 100 can be issued.

FIG. 53 shows the scoreboard 100 in the case where the memory controller 10 has received instruction (5) "Read abcd70." The memory controller 10 selects empty entry No. 0 from the scoreboard 100 for area 0 corresponding to the address of instruction "Read abcd70" and enters the instruction in the entry. Only entry No. 0, entry No. 1, and entry No. 2 on the scoreboard 100 can be issued.

The above-described processes enable the memory controller 10 to select and issue a memory access instruction according to the predetermined synchronizing condition.

(Sixth Embodiment)

Figure 54:
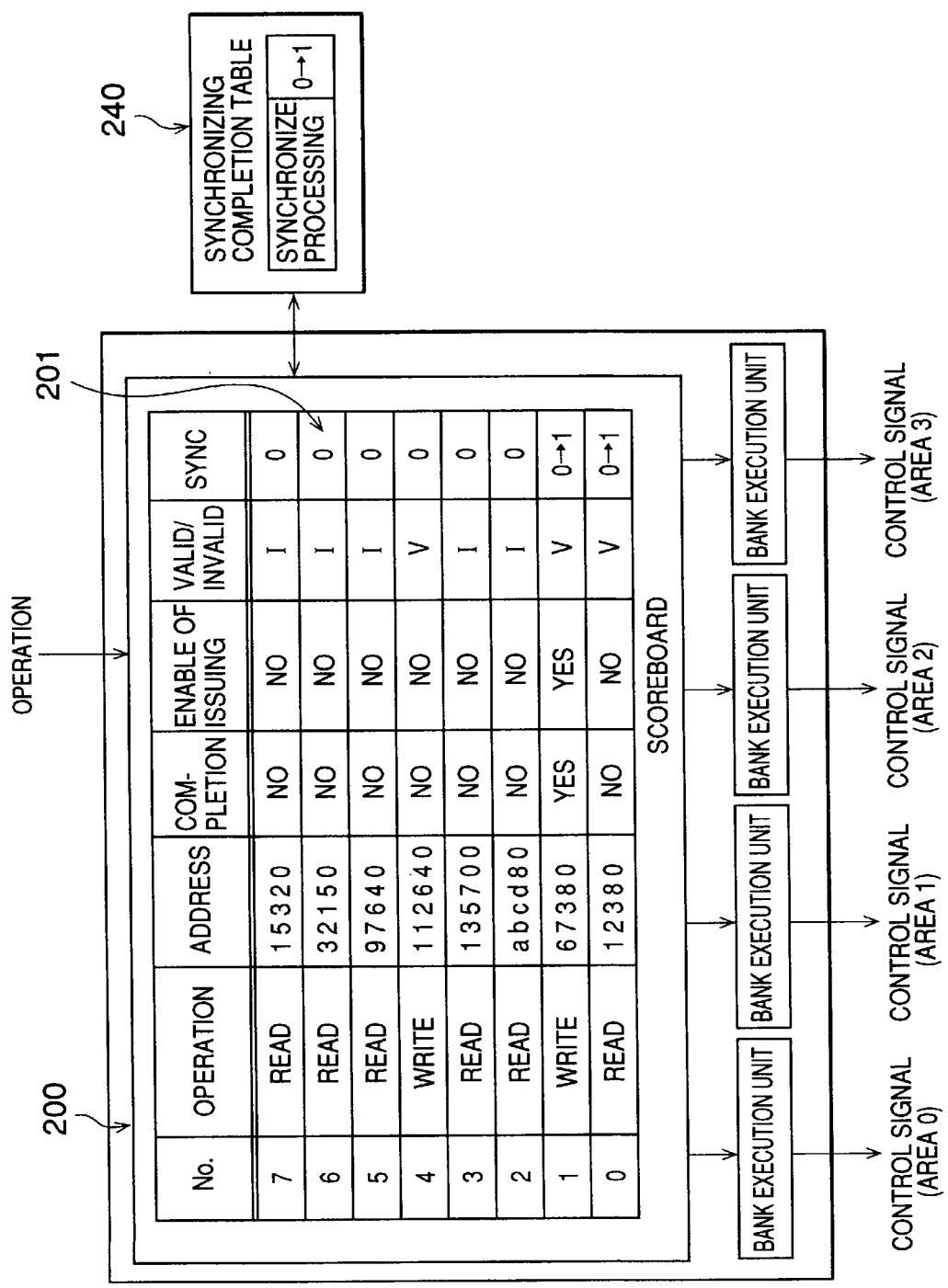
FIG. 54 is a conceptual diagram to help explain the structure of a scoreboard according to a sixth embodiment of the present invention.

As shown in FIG. 54, a sixth embodiment of the present invention is such that all of the memory area, or the memory control range, is managed by a single scoreboard 200 and no synchronization completion table is used. In other words, the sixth embodiment is a system that manages the state of operations in the individual memory areas collectively, whereas the first embodiment is a system that manages the individual memory areas distributively. The basic operation is the same as that in the first embodiment.

As shown in FIG. 54, a memory controller 10 of the sixth embodiment uses the single scoreboard 200 to manage the state of the operation of each of bank memories BM0 to BM3 and generates control signals for four memory areas 0 to 3. When a synchronizing operation is issued, a flag indicating that it is an operation before synchronization is set at "1" as a synchronization flag 201, thereby distinguishing it from an operation after synchronization.

Furthermore, a synchronization completion flag is set at "1" in a synchronization completion table 240 until the synchronizing process has been completed, thereby refusing the acceptance of a subsequent synchronizing operation and causing the synchronizing operations to be retried. With the single scoreboard, when the synchronization flags 201 are at "0" for all of the entries, this means that the synchronization has been completed. Therefore, the synchronization completion table 240 may be omitted.

(Seventh Embodiment)

Figure 55:
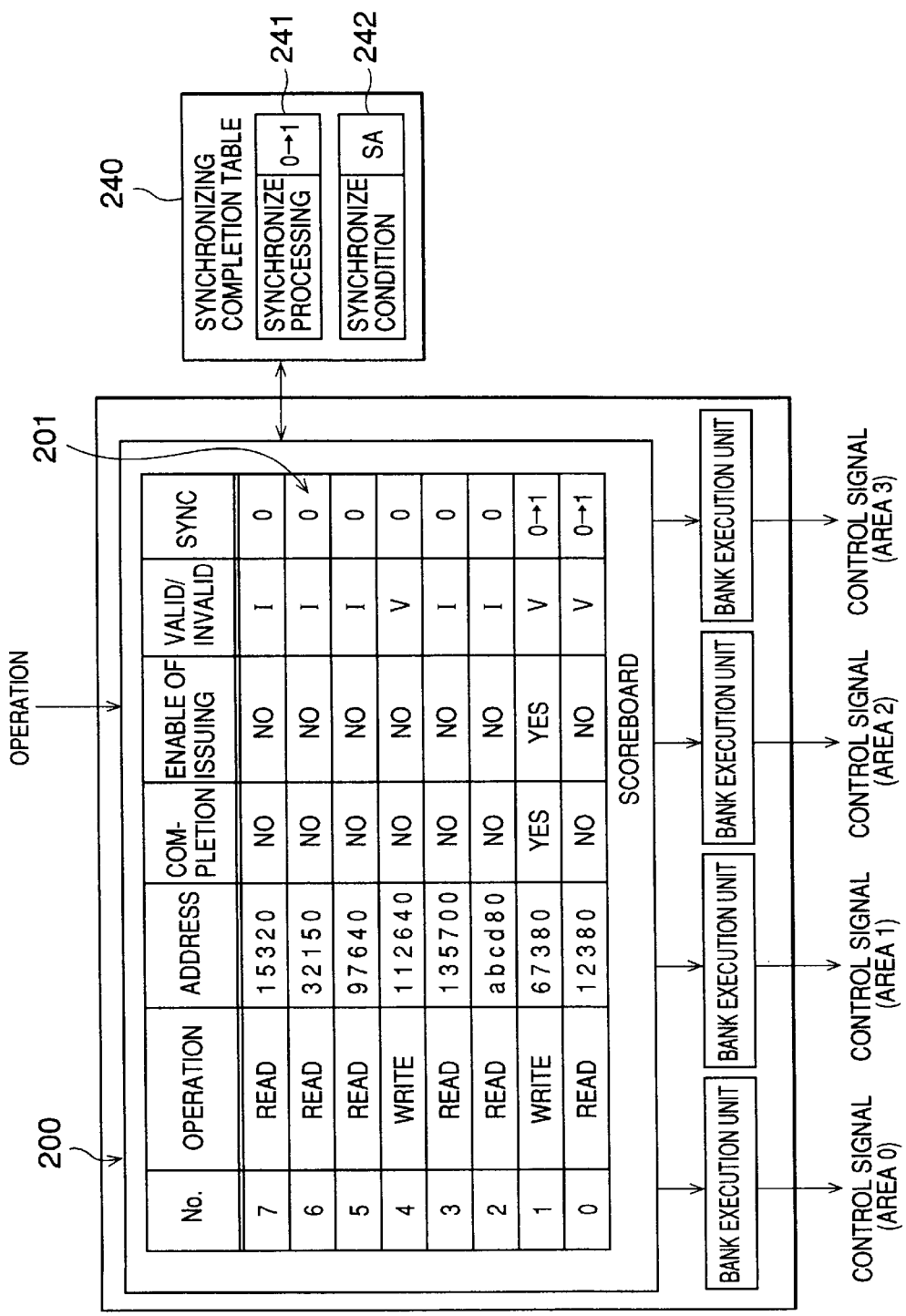
FIG. 55 is a conceptual diagram to help explain the structure of a scoreboard according to a seventh embodiment of the present invention.

As shown in FIG. 55, like the sixth embodiment, a seventh embodiment of the present invention is such that a single scoreboard 200 is used to manage the state of the operation of the individual memory areas collectively and a synchronization completion table 240 in which a synchronization completion flag 241 and synchronization condition 242 for all of the individual entries are set is provided.

Specifically, with the seventh embodiment, a synchronizing process (a strong-order process) is executed only on the operations satisfying the synchronization condition 242 (here, the same address SA), whereas a normal out-of-order process or weak-order process is executed on the operations not satisfying the synchronization condition.

The seventh embodiment differs from the sixth embodiment in that the synchronization condition 242 is added to the synchronization completion table 240 as shown in FIG. 55. Therefore, the seventh embodiment differs from the sixth embodiment only in collective management method. The basic operation of the seventh embodiment is the same as that of the second embodiment.

With the seventh embodiment, too, when the synchronization completion table 24 is omitted, it is necessary to enter a synchronizing operation in the scoreboard 200 and determine whether or not the synchronization condition is satisfied each time a subsequent operation arrives. At the time when the subsequent operation is entered, a synchronization flag 201 is set in the scoreboard 200. Use of synchronization flags defining three states, "before synchronization", "after synchronization", and "regardless of synchronization," facilitates control. The completion of synchronization can be determined from the disappearance of the entries for "before synchronization" in the scoreboard.

(Eighth Embodiment)

Figure 56:
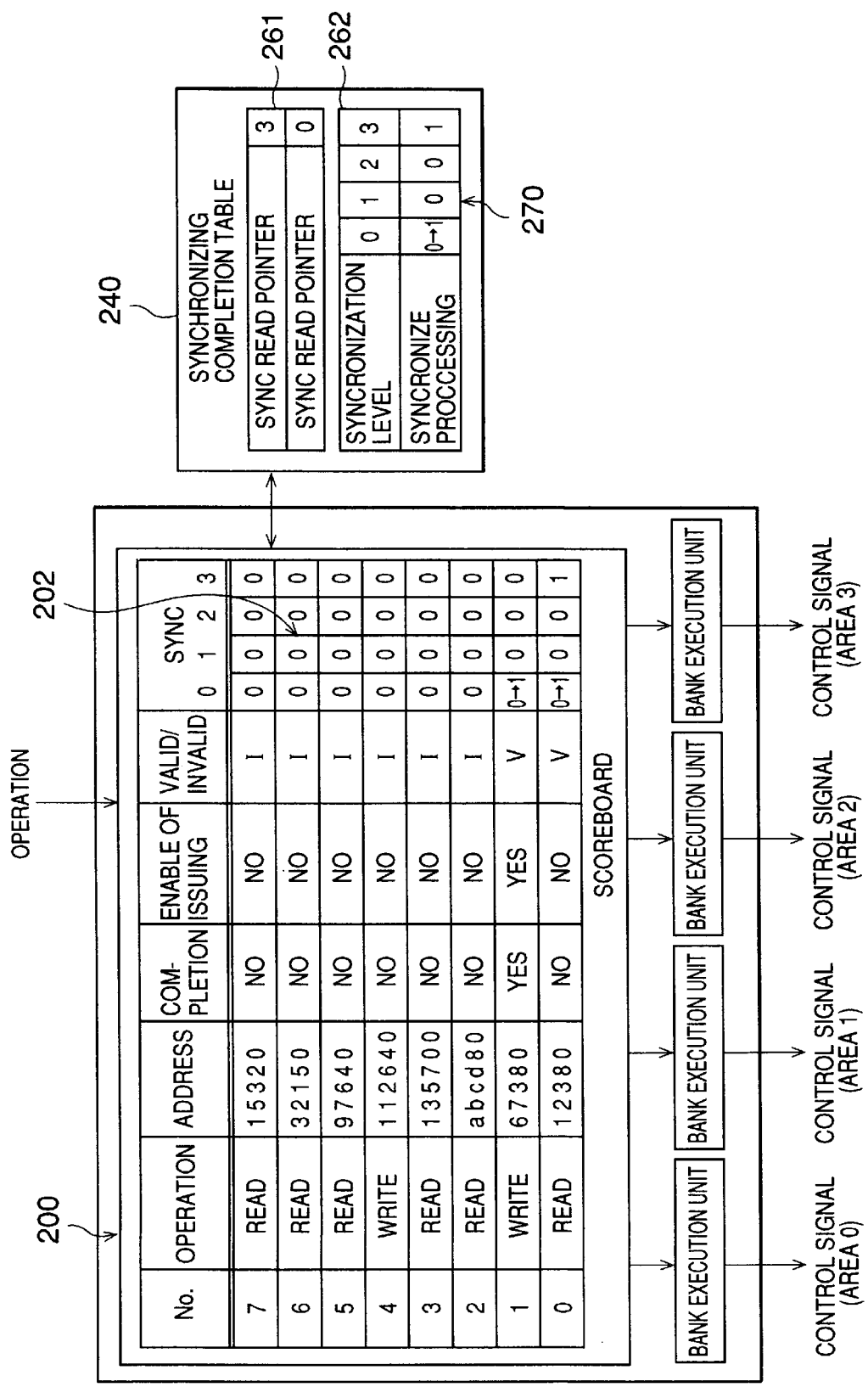
FIG. 56 is a conceptual diagram to help explain the structure of a scoreboard according to an eighth embodiment of the present invention.

As shown in FIG. 56, like the sixth embodiment, an eighth embodiment of the present invention is such that a single scoreboard 200 is used to manage the state of the operation of the individual memory areas collectively and the entries for synchronization flags of multiple levels are entered as in the third embodiment. With the eight embodiment, too, when only one scoreboard 200 is used, a synchronization completion table 240 may be omitted.

As shown in FIG. 56, the eighth embodiment is such that the entries for synchronization flags 202 of multiple levels are provided in the scoreboard 200 so as to correspond to the multiple synchronization levels. The detailed operation of the eighth embodiment is the same as that in the third embodiment. Specifically, with the eighth embodiment, it is assumed that the synchronization flag 202 has four levels 0 to 3 for each entry. The synchronization completion flag in the synchronization completion table 240 is also assumed to have four levels. A synchronization (SYNC) read pointer 261 indicates which level is being executed and a synchronization write pointer 262 indicates the next synchronization level.

When the synchronization completion table 240 is omitted, a synchronizing operation is entered in the scoreboard and each time a subsequent operation arrives, it is determined whether or not the synchronization condition is satisfied. At the time when the subsequent operation is entered, a synchronization flag 202 is set. In this case, use of synchronization flags defining three states, "before synchronization", "after synchronization", and "regardless of synchronization," facilitates control. The completion of synchronization can be determined from the disappearance of the entries for "before synchronization" in the scoreboard.

(Ninth Embodiment)

Figure 57:
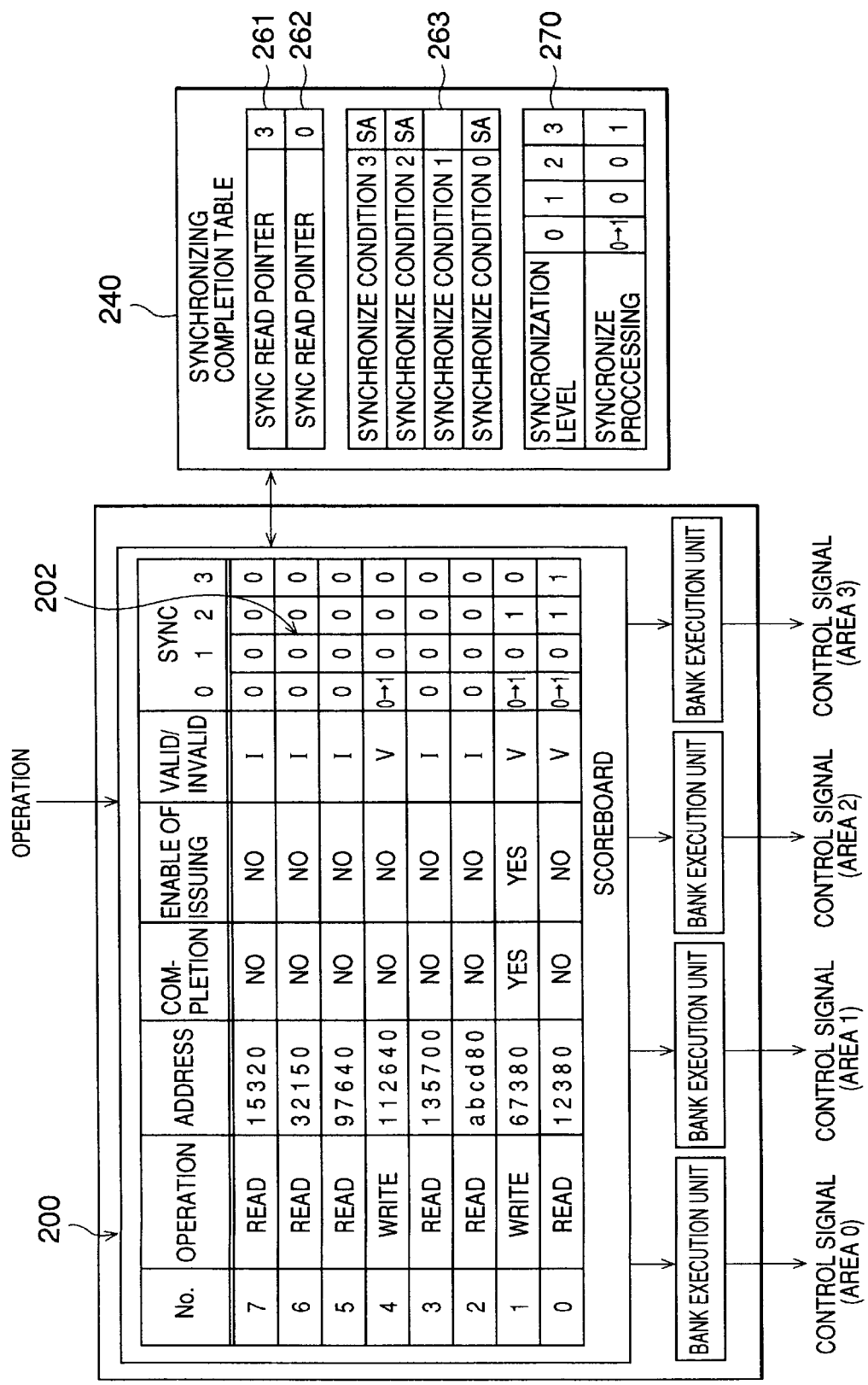
FIG. 57 is a conceptual diagram to help explain the structure of a scoreboard according to a ninth embodiment of the present invention.

As shown in FIG. 57, like the sixth embodiment, a ninth embodiment of the present invention is such that a single scoreboard 200 is used to manage the state of the operation of the individual memory areas collectively and a synchronization completion table 240 provided with entries 263 indicating synchronization conditions (in this case, the same address SA) for each of synchronization levels 0 to 3 is provided as in the fourth embodiment.

Specifically, the ninth embodiment is such that the entries 263 indicating a plurality of synchronization conditions are provided in the synchronization completion table 240 according to the multiple synchronization levels. The detailed operation of the ninth embodiment is the same as that in the fourth embodiment.

When the synchronization completion table 240 is omitted, a synchronizing operation is entered in the scoreboard and each time a subsequent operation arrives, it is determined whether or not the synchronization condition is satisfied. At the time when the subsequent operation is entered, a synchronization flag 202 is set. In this case, use of synchronization flags defining three states, "before synchronization", "after synchronization", and "regardless of synchronization," facilitates control. The completion of synchronization can be determined from the disappearance of the entries for "before synchronization" in the scoreboard.

(Tenth Embodiment)

Figure 58:
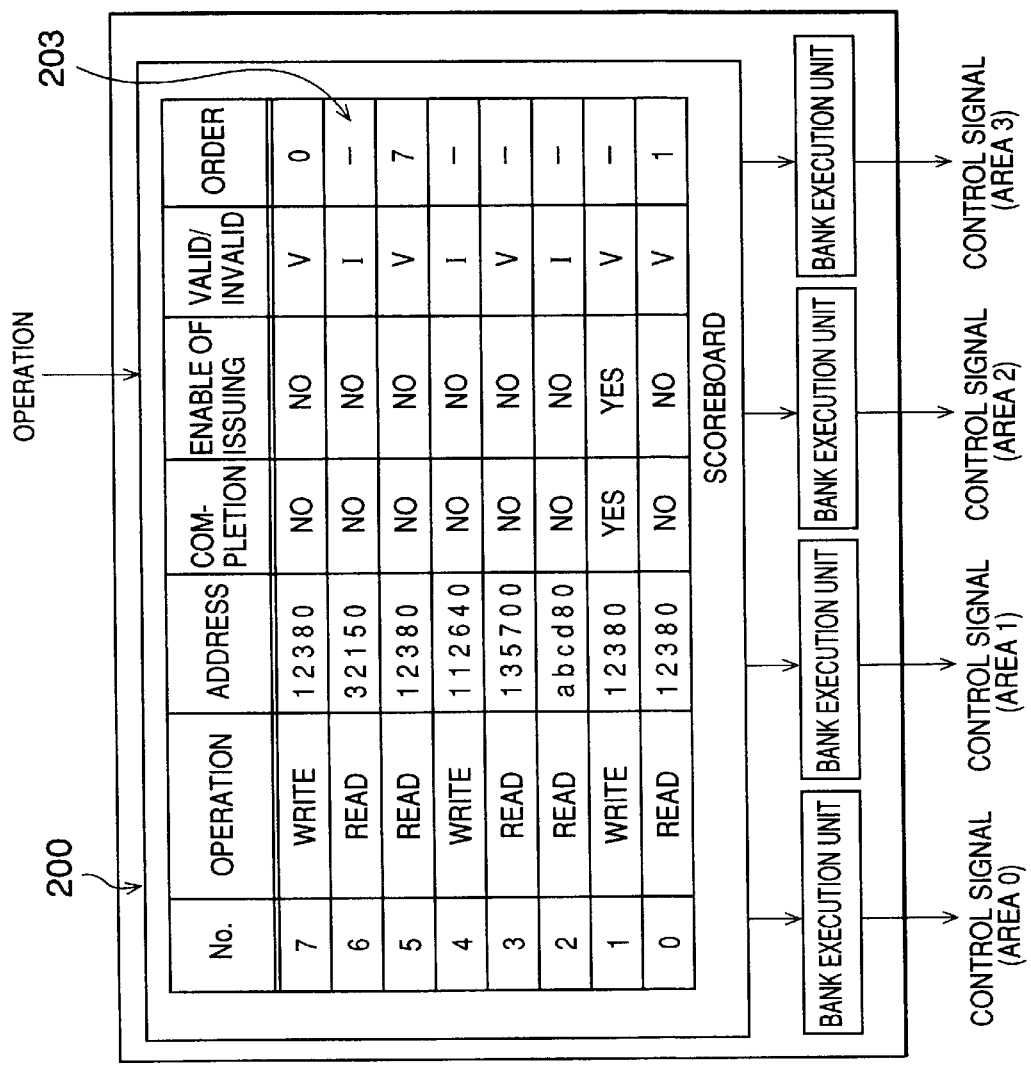
FIG. 58 is a conceptual diagram to help explain the structure of a scoreboard according to a tenth embodiment of the present invention.

As shown in FIG. 58, like the sixth embodiment, a tenth embodiment of the present invention is such that a single scoreboard 200 is used to manage the state of the operation of the individual memory areas collectively and the synchronization conditions are applied to all of the operations (regardless of synchronization). With the tenth embodiment, too, when operations having the condition for a synchronizing operation are executed (for the same request or the same address), only the operations meeting the synchronization conditions are always executed, regardless of the execution of synchronization. This not only enables the synchronization flags and synchronization completion flags to be omitted but also prevents operations after the synchronization instruction from being retried, thereby improving the processing capability of the system.

Specifically, as shown in FIG. 58, the tenth embodiment is such that the synchronization conditions are applied to all of the operations, the synchronization flags and synchronization completion table are omitted, and the entries for order flags 203 indicating preceding operations are added to the scoreboard 200. When a preceding operation has the same address, for example, the entry number of the preceding operation is set in the entries. When the preceding operation has been issued or invalidated, the order flag is invalidated (−) to enable an operation to be issued. The detailed operation of the tenth embodiment is the same as that in the fifth embodiment.

As has been explained in detail so far, with the present invention, in a memory controller applied to a multiprocessor system, use of a management table makes it possible not only to manage the state of memory accessing but also to seemingly accept a subsequent operation (or an operation satisfying the synchronization conditions) when a synchronizing operation is executed. Therefore, it is possible to prevent the unit requesting a subsequent operation from retrying the request, resulting in a decrease in the overhead of the system in the synchronizing process.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

I claim:

1. A memory controller for controlling a memory in response to receiving memory access instructions as out-of-order or weakly-ordered instructions and at least one synchronizing instruction as a strongly-ordered instruction, said memory controller comprising:

an instruction management table having a plurality of entries storing information showing the progress of execution of the received memory access instructions, each of the plurality of entries including at least one sync flag indicating whether a corresponding memory access instruction was received prior to the synchronizing instruction; and means for executing the received memory access instructions by executing memory access instructions received subsequent to the synchronizing instruction after the execution of all of the memory access instructions received prior to the synchronizing instruction have been completed, based on the information of the entries including the sync flags.

2. A memory controller according to claim 1, further comprising means for sequentially receiving each of the issued memory access instructions, registering each said received memory access instruction in said instruction management table, and setting a corresponding sync flag for each said received memory access instruction, the sync flag indicating that the memory access instruction was not received prior to the synchronizing instruction.

3. A memory controller according to claim 2, further comprising means for receiving the synchronizing instruction and changing all of the sync flags of the memory access instructions registered in said instruction management table so as to indicate that the memory access instructions were received prior to the synchronizing instruction.

4. A memory controller according to claim 1, wherein each of the plurality of entries in said instruction management table further include a completion flag indicating whether the execution of a corresponding memory access instruction has been completed.

5. A memory controller according to claim 1, further comprising a synchronization completion table having a plurality of entries storing information for the memory access instructions received prior to the synchronizing instruction, each of the plurality of entries having a sync completion flag indicating whether the execution of a corresponding memory access instruction received prior to the synchronizing instruction has been completed.

6. A memory controller according to claim 5, wherein said synchronization completion table further includes an entry storing information indicating a condition for executing the memory access instruction received prior to the synchronizing instruction.

7. A memory controller according to claim 1, wherein each of the plurality of entries in said instruction management table further include a flag indicating whether a corresponding memory access instruction is executable.

8. A memory control method for use in a computer system having a memory controller for controlling a memory in response to receiving memory access instructions as out-of-order or weakly-ordered instructions and at least one synchronizing instruction as a strongly-ordered instruction, said memory controller including an instruction management table having a plurality of entries storing information showing the progress of execution of the received memory access instructions, said method comprising the steps of:

causing each of the plurality of entries to include at least one sync flag indicating whether a corresponding memory access instruction was received prior to the synchronizing instruction; and executing the received memory access instructions by executing memory access instructions received subsequent to the synchronizing instruction after the execution of all of the memory access instructions received prior to the synchronizing instruction have been completed, based on the information of the entries including the sync flags.

9. A method according to claim 8, further comprising the steps of sequentially receiving each of the issued memory access instructions, registering each said received memory access instruction in said instruction management table, and setting a corresponding sync flag for each said received memory access instruction, the sync flag indicating that the memory access instruction was not received prior to the synchronizing instruction.

10. A method according to claim 9, further comprising the steps of receiving the synchronizing instruction and changing all of the sync flags of the memory access instructions registered in said instruction management table so as to indicate that the memory access instructions were received prior to the synchronizing instruction.

11. A method according to claim 8, wherein each of the plurality of entries in said instruction management table further includes a completion flag indicating whether or not the execution of a corresponding memory access instruction has been completed.

12. A method according to claim 8, wherein said memory controller further includes a synchronization completion table having a plurality of entries storing information for the memory access instructions received prior to the synchronizing instruction, each of the plurality of entries having a sync completion flag indicating whether the execution of a corresponding memory access instruction received prior to the synchronizing instruction has been completed.

13. A method according to claim 12, wherein said synchronization completion table further includes an entry storing information indicating a condition for executing the memory access instruction received prior to the synchronizing instruction.

14. A method according to claim 8, wherein each of the plurality of entries in said instruction management table further include a flag indicating whether a corresponding memory access instruction is executable.

* * * * *